US011140345B2

(12) United States Patent
Saito et al.

(10) Patent No.: US 11,140,345 B2
(45) Date of Patent: Oct. 5, 2021

(54) SOLID STATE IMAGING DEVICE, IMAGING SYSTEM, AND DRIVE METHOD OF SOLID STATE IMAGING DEVICE

(71) Applicant: CANON KABUSHIKI KAISHA, Tokyo (JP)

(72) Inventors: Kazuhiro Saito, Tokyo (JP); Tetsuya Itano, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 43 days.

(21) Appl. No.: 16/198,520

(22) Filed: Nov. 21, 2018

(65) Prior Publication Data

US 2019/0166323 A1 May 30, 2019

(30) Foreign Application Priority Data

Nov. 30, 2017 (JP) .............................. JP2017-230018

(51) Int. Cl.
*H04N 5/3745* (2011.01)
*H04N 5/378* (2011.01)
(Continued)

(52) U.S. Cl.
CPC .............. *H04N 5/3745* (2013.01); *G06T 7/55* (2017.01); *H04N 5/378* (2013.01); *B60Q 9/008* (2013.01);
(Continued)

(58) Field of Classification Search
CPC ........ H04N 5/3745; H04N 5/378; G06T 7/55; G06T 2207/30261; B60Q 9/008;
(Continued)

(56) References Cited

U.S. PATENT DOCUMENTS 7,126,102 B2   10/2006   Inoue et al. ............... 250/214 R
7,321,110 B2   1/2008    Okita et al. ................ 250/208.1
(Continued)

FOREIGN PATENT DOCUMENTS

CN    107079116 A    8/2017
JP    2008-199581    8/2008
(Continued)

OTHER PUBLICATIONS

Japanese Office Action dated Nov. 7, 2019 during prosecution of related Japanese application No. 2017-230018. (English-language machine translation included.).
(Continued)

*Primary Examiner* — Jae N Noh
(74) *Attorney, Agent, or Firm* — Venable LLP

(57) ABSTRACT

In a solid state imaging device as an embodiment, an analog-to-digital converter unit converts, in a first period, a first pixel signal into a digital signal, performs, in a determination period after the first period, the comparison of a second pixel signal with the reference signal set to a predetermined threshold, and converts, in a second period after the determination period, the second pixel signal at a gain in accordance with a result of the comparison performed in the determination period into a digital signal. Until the reference signal reaches the threshold from the first period, the reference signal generation unit changes the reference signal without changing a direction of change of the reference signal with respect to the lapse of time.

19 Claims, 12 Drawing Sheets

(51) Int. Cl.
*G06T 7/55* (2017.01)
*B60W 50/00* (2006.01)
*B60W 30/09* (2012.01)
*B60Q 9/00* (2006.01)

(52) U.S. Cl.
CPC ............ *B60W 30/09* (2013.01); *B60W 50/00* (2013.01); *B60W 2050/0047* (2013.01); *B60W 2520/10* (2013.01); *B60W 2520/14* (2013.01); *B60W 2540/18* (2013.01); *G06T 2207/30261* (2013.01)

(58) Field of Classification Search
CPC ................ B60W 30/09; B60W 50/00; B60W 2050/0047; B60W 2520/10; B60W 2520/14; B60W 2540/18
USPC ........................................................ 348/135
See application file for complete search history.

(56) References Cited

U.S. PATENT DOCUMENTS

| | | | |
|---|---|---|---|
| 7,385,172 B2 | 6/2008 | Inoue et al. | 250/214 R |
| 7,408,210 B2 | 8/2008 | Ogura et al. | 257/233 |
| 7,460,162 B2 | 12/2008 | Koizumi et al. | 348/294 |
| 7,462,810 B2 | 12/2008 | Kobayashi et al. | 250/208.1 |
| 7,528,878 B2 | 5/2009 | Sato et al. | 348/317 |
| 7,550,793 B2 | 6/2009 | Itano et al. | 257/239 |
| 7,592,579 B2 | 9/2009 | Tamura et al. | 250/208.1 |
| 7,709,780 B2 | 5/2010 | Inoue et al. | 250/214.1 |
| 7,719,587 B2 | 5/2010 | Ogura et al. | 348/302 |
| 7,741,593 B2 | 6/2010 | Iwata et al. | 250/214 R |
| 7,825,974 B2 | 11/2010 | Itano et al. | 348/308 |
| 7,920,192 B2 | 4/2011 | Watanabe et al. | 348/308 |
| 7,978,241 B2 | 7/2011 | Koizumi et al. | 348/294 |
| 7,982,789 B2 | 7/2011 | Watanabe et al. | 348/308 |
| 8,023,025 B2 | 9/2011 | Itano et al. | 348/308 |
| 8,063,351 B2 | 11/2011 | Kobayashi et al. | 250/208.1 |
| 8,063,958 B2 | 11/2011 | Okita et al. | 348/241 |
| 8,063,967 B2 | 11/2011 | Itano et al. | 348/308 |
| 8,081,245 B2 | 12/2011 | Itano et al. | 348/301 |
| 8,085,319 B2 | 12/2011 | Ono et al. | 348/241 |
| 8,159,577 B2 | 4/2012 | Iwata et al. | 348/296 |
| 8,289,431 B2 | 10/2012 | Itano | 348/308 |
| 8,355,066 B2 | 1/2013 | Iwata et al. | 348/296 |
| 8,363,137 B2 | 1/2013 | Sonoda et al. | 348/302 |
| 8,368,790 B2 | 2/2013 | Itano et al. | 348/301 |
| 8,390,708 B2 | 3/2013 | Koizumi et al. | 348/294 |
| 8,400,546 B2 | 3/2013 | Itano et al. | 348/308 |
| 8,411,187 B2 | 4/2013 | Watanabe et al. | 348/308 |
| 8,441,558 B2 | 5/2013 | Okita et al. | 348/241 |
| 8,553,118 B2 | 10/2013 | Saito et al. | 348/300 |
| 8,598,901 B2 | 12/2013 | Hiyama et al. | 324/750.3 |
| 8,670,049 B2 | 3/2014 | Ono et al. | 348/241 |
| 8,698,935 B2 | 4/2014 | Okita et al. | 348/314 |
| 8,711,259 B2 | 4/2014 | Maehashi et al. | 348/294 |
| 8,749,675 B2 | 6/2014 | Koizumi et al. | 348/294 |
| 8,836,838 B2 | 9/2014 | Nakamura et al. | 348/308 |
| 8,885,084 B2 | 11/2014 | Egawa | |
| 8,896,029 B2 | 11/2014 | Koizumi et al. | 257/202 |
| 8,928,786 B2 | 1/2015 | Iwata et al. | 348/294 |
| 9,029,752 B2 | 5/2015 | Saito et al. | 250/208.1 |
| 9,083,906 B2 | 7/2015 | Nakamura et al. | H04N 5/37455 |
| 9,118,857 B2 | 8/2015 | Iwata et al. | H04N 5/3698 |
| 9,232,165 B2 | 1/2016 | Saito et al. | H04N 5/3575 |
| 9,288,415 B2 | 3/2016 | Yamazaki et al. | H04N 5/37455 |
| 9,300,889 B2 | 3/2016 | Hashimoto et al. | H04N 5/363 |
| 9,337,222 B2 | 5/2016 | Saito et al. | H04N 3/1568 |
| 9,438,828 B2 | 9/2016 | Itano et al. | H04N 5/35554 |
| 9,438,841 B2 | 9/2016 | Yamazaki et al. | H04N 5/37455 |
| 9,602,752 B2 | 3/2017 | Kobayashi et al. | H04N 5/378 |
| 9,602,753 B2 | 3/2017 | Saito et al. | H03M 1/34 |
| 9,825,077 B2 | 11/2017 | Watanabe et al. | H01L 27/14609 |
| 9,900,539 B2 | 2/2018 | Yamasaki et al. | H04N 5/378 |
| 10,051,223 B2 | 8/2018 | Yamashita et al. | H04N 5/335 |
| 10,057,529 B2 | 8/2018 | Saito et al. | H01L 27/14634 |
| 10,609,318 B2 | 3/2020 | Sakakibara | |
| 2011/0003426 A1 | 1/2011 | Watanabe et al. | 438/73 |
| 2011/0013050 A1* | 1/2011 | Aruga | H04N 5/3598 348/241 |
| 2013/0002916 A1 | 1/2013 | Itano | 348/302 |
| 2013/0271633 A1 | 10/2013 | Hashimoto et al. | H04N 5/353 |
| 2014/0184844 A1 | 7/2014 | Muto et al. | H04N 5/355 |
| 2014/0320713 A1* | 10/2014 | Egawa | H04N 5/355 348/301 |
| 2015/0122975 A1 | 5/2015 | Saito et al. | 250/208.1 |
| 2015/0194283 A1* | 7/2015 | Hwang | H01H 47/001 307/116 |
| 2016/0227141 A1 | 8/2016 | Kobayashi et al. | H04N 5/3698 |
| 2016/0286152 A1* | 9/2016 | Kobayashi | H04N 5/37455 |
| 2018/0084206 A1 | 3/2018 | Saito et al. | H04N 5/359 |
| 2018/0097960 A1 | 4/2018 | Ochiai et al. | H04N 5/357 |
| 2018/0098012 A1 | 4/2018 | Takado et al. | H04N 5/374 |
| 2018/0102386 A1 | 4/2018 | Kobayashi et al. | H01L 27/14609 |
| 2018/0184031 A1 | 6/2018 | Morita et al. | H04N 5/374 |
| 2018/0197907 A1 | 7/2018 | Wada et al. | H01L 27/14612 |
| 2018/0213219 A1 | 7/2018 | Kono et al. | H04N 17/002 |
| 2018/0309950 A1 | 10/2018 | Yamashita et al. | H04N 5/335 |
| 2018/0316884 A1 | 11/2018 | Kuroda et al. | H04N 5/378 |
| 2019/0104273 A1 | 4/2019 | Sato | |

FOREIGN PATENT DOCUMENTS

| | | | | |
|---|---|---|---|---|
| JP | 2008-199581 A | * | 8/2008 | ............ H04N 5/335 |
| JP | 2011-259305 | | 12/2011 | |
| JP | 2013-236362 | | 11/2013 | |
| JP | 2014-131147 | | 7/2014 | |
| JP | 2016-181736 | | 10/2016 | |
| WO | 2017/169724 | | 10/2017 | |

OTHER PUBLICATIONS

U.S. Appl. No. 16/183,767, filed Nov. 8, 2018.
Y. Oike et al., "An 8.3M-Pixel 480fps Global-Shutter CMOS Image Sensor with Gain-Adaptive Column ADCs and 2-on-1 Stacked Device Structure," in Symp. VLSI Circuits Dig. Tech. Papers, Jun. 2016.
Chinese Office Action dated Jun. 3, 2021 during prosecution of related Chinese application No. 201811420733.5. (English-language machine translation included.).

* cited by examiner

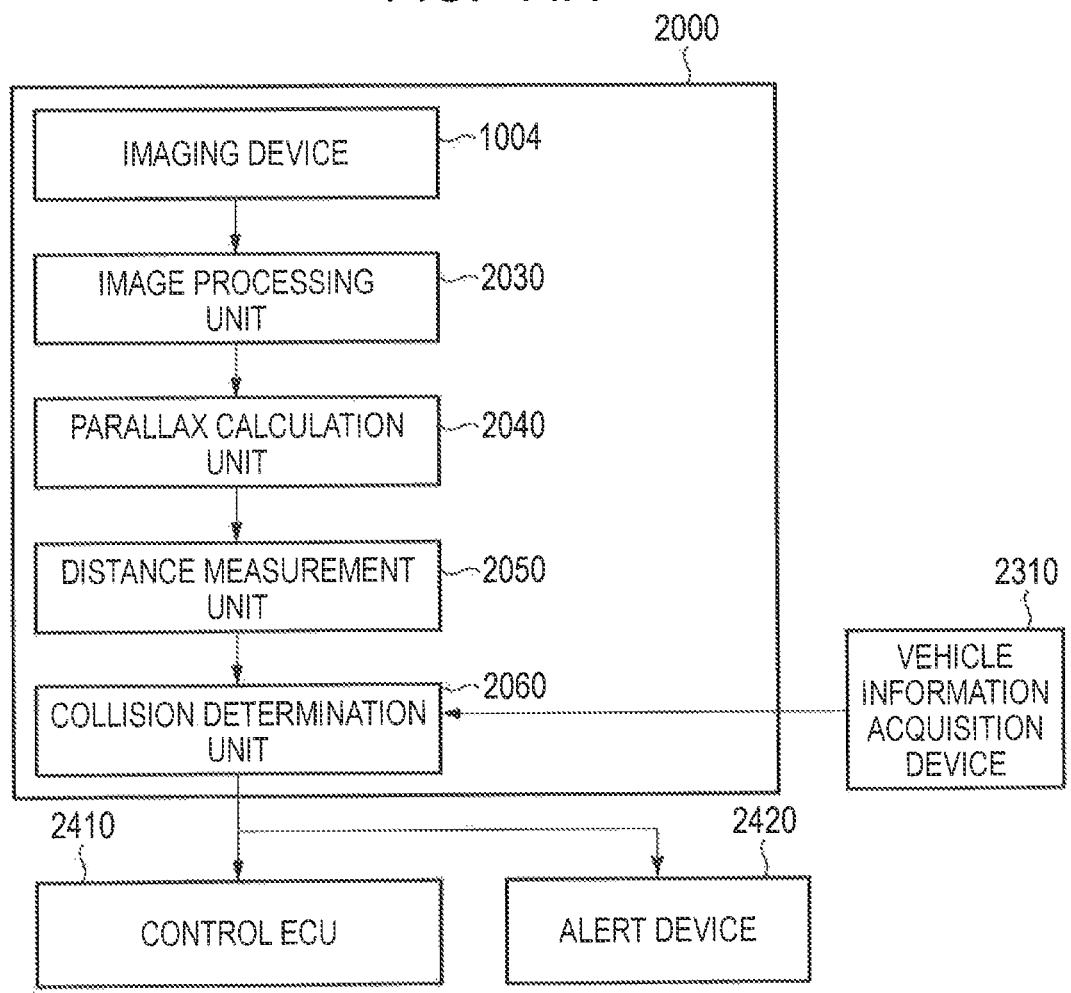
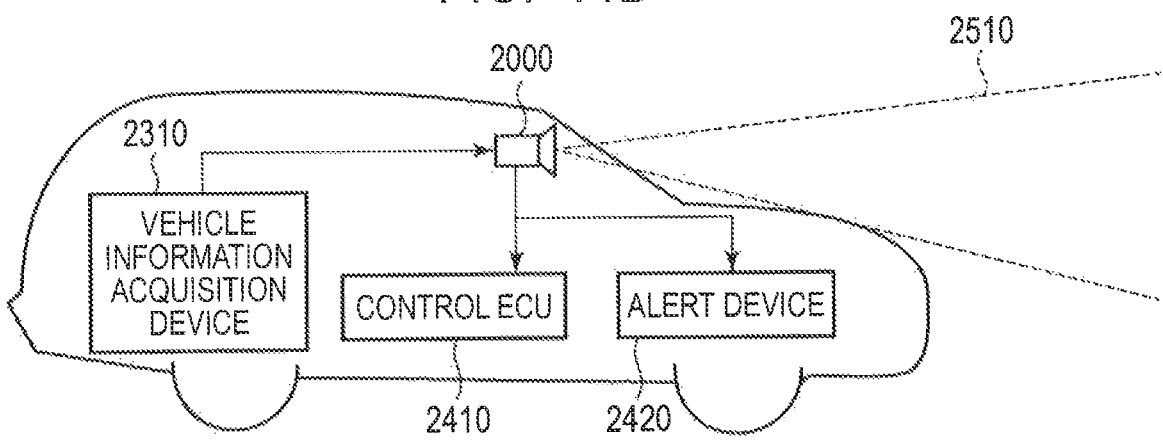

SOLID STATE IMAGING DEVICE, IMAGING SYSTEM, AND DRIVE METHOD OF SOLID STATE IMAGING DEVICE

BACKGROUND OF THE INVENTION

Field of the Invention

The present invention relates to a solid state imaging device, an imaging system, and a drive method of a solid state imaging device.

Description of the Related Art

In recent years, CMOS image sensors having an analog-to-digital (AD) converter circuit have been used. A photoelectric conversion device disclosed in Japanese Patent Application Laid-Open No. 2014-131147 sets a gain in AD conversion based on comparison of an analog signal to a threshold.

In the photoelectric conversion device disclosed in Japanese Patent Application Laid-Open No. 2014-131147, however, since a reference signal is changed from a reference level to a threshold when a gain is set, time is required to generate the threshold. Further, when the slope of the reference signal is increased for faster operation, this will cause insufficient accuracy in the threshold.

The present invention has been made in view of the above problems and intends to realize fast and accurate analog-to-digital conversion.

SUMMARY OF THE INVENTION

A solid state imaging device in one embodiment of the present invention includes: a pixel including at least one photoelectric conversion unit; a reference signal generation unit that generates at least one reference signal that changes with the lapse of time at a predetermined change rate; and an analog-to-digital converter unit that converts the pixel signal into a digital signal based on comparison of a pixel signal output from the pixel with the reference signal. The analog-to-digital converter unit converts, in a first period, a first pixel signal into a first digital signal, performs, in a determination period after the first period, the comparison of a second pixel signal with the reference signal set to a predetermined threshold, and converts, in a second period after the determination period, the second pixel signal at a gain in accordance with a result of the comparison performed in the determination period into a second digital signal. Until the reference signal reaches the threshold from the first period, the reference signal generation unit changes the reference signal without changing a direction of change of the reference signal with respect to the lapse of time.

A drive method of a solid state imaging device in another embodiment of the present invention is a drive method of a solid state imaging device having a pixel that includes a photoelectric conversion unit, a reference signal generation unit that generates a reference signal that changes with the lapse of time at a predetermined change rate, and an analog-to-digital converter unit that, based on comparison of a pixel signal output from the pixel with the reference signal, converts the pixel signal into a digital signal. The drive method includes: reading out, from the pixel, a first pixel signal obtained at a time of reset of the photoelectric conversion unit; converting the first pixel signal into a first digital signal in a first period; reading out, from the pixel, a second pixel signal based on charges accumulated in the photoelectric conversion unit; performing the comparison of the second pixel signal with the reference signal set to a predetermined threshold in a determination period; converting the second pixel signal into a second digital signal at a gain in accordance with a result of the comparison performed in the determination period in a second period; and, until the reference signal reaches the threshold from the first period, changing the reference signal without changing a direction of change of the reference signal with respect to the lapse of time.

Further features of the present invention will become apparent from the following description of exemplary embodiments with reference to the attached drawings.

BRIEF DESCRIPTION OF THE DRAWINGS

FIG. 14A is a block diagram of an imaging system in a sixth embodiment.

FIG. 14B is a block diagram of the imaging system in the sixth embodiment.

DESCRIPTION OF THE EMBODIMENTS

Embodiments of the present invention will be described below. A solid state imaging device of each of first to fourth embodiments has at least one pixel including a photoelectric conversion unit, a reference signal generation unit that generates a reference signal changing at a predetermined change rate with the lapse of time, and an analog-to-digital converter unit that convers a pixel signal into a digital signal based on a result of the comparison of the pixel signal with the reference signal. The analog-to-digital converter unit converts a first pixel signal into a first digital signal in a first period and converts a second pixel signal into a second digital signal at a predetermined gain in a second period. Further, the analog-to-digital converter unit compares the second pixel signal with the reference signal set at a predetermined threshold in a determination period between the first period and the second period. Until the reference signal reaches the threshold from the first period, the reference signal generation unit changes the reference signal without changing the direction of change in the reference signal with respect to the lapse of time.

In the present embodiment, the reference signal is changed up to the threshold without changing the direction of change until the reference signal reaches the threshold from the first period. Thus, the time required for setting a threshold can be reduced compared to a case where the reference signal is changed from the reference level after the first period. Further, since a fast operation can be realized without an increase in the slope of the reference signal, the threshold can be set at high accuracy.

Preferred embodiments of the present invention will now be described in detail in accordance with the accompanying drawings. The present invention is not limited to the embodiments described below. For example, a part of the configuration of any of the following embodiments may be added to another embodiment or may be replaced with a part of the configuration of another embodiment.

First Embodiment

Figure 1:
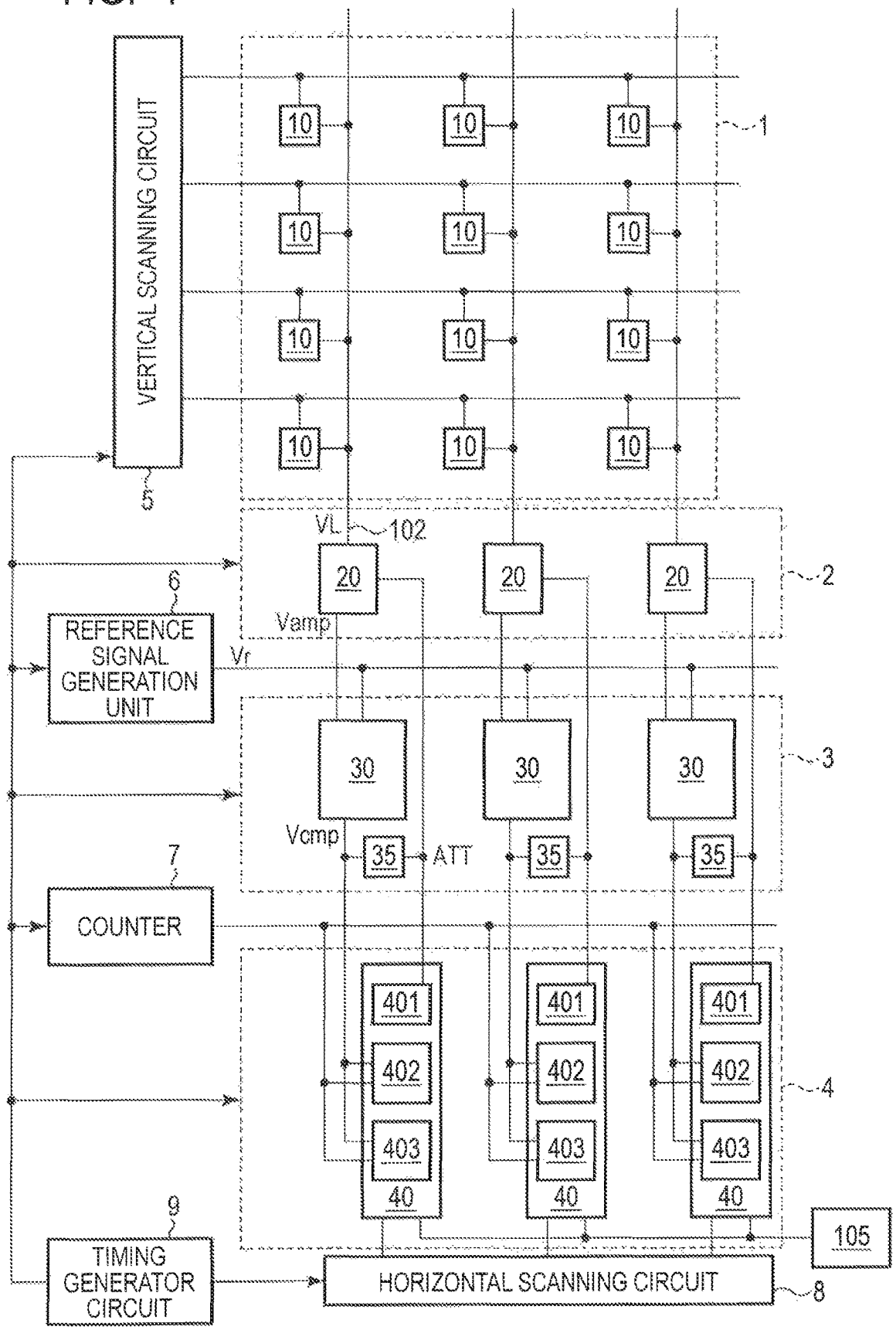
FIG. 1 is a block diagram of a solid state imaging device in a first embodiment.

FIG. 1 is a block diagram of a solid state imaging device in the present embodiment. The solid state imaging device is a complementary metal oxide semiconductor (CMOS) image sensor, for example, and has a pixel array 1, an amplifier unit 2, a comparator unit 3, a memory unit 4, a vertical scanning circuit 5, a reference signal generation unit 6, a counter 7, a horizontal scanning circuit 8, a timing generator circuit 9, and a signal processing unit 105.

The pixel array 1 has a plurality of pixels 10 aligned in a matrix, and each of the pixels 10 has a photoelectric conversion unit that generates and accumulates signal charges based on an irradiation light. Note that, in the present specification, the row direction refers to the horizontal direction in the drawings, and the column direction refers to the vertical direction in the drawings. Micro-lenses and color filters may be arranged on the pixels 10. The color filters are primary-color filters of red, blue, and green, for example, and provided on respective pixels 10 in accordance with the Bayer arrangement. Some of the pixels 10 are shielded from light as optical black pixels (OB pixels). In the plurality of pixels 10, a ranging row on which focus detection pixels that output pixel signals used for focus detection are arranged and a plurality of imaging rows on which imaging pixels that output pixel signals used for generating an image are arranged may be provided. The vertical scanning circuit 5 is formed of shift registers, gate circuits, buffer circuits, or the like and outputs control signals to the pixels 10 based on a vertical synchronization signal, a horizontal synchronization signal, a clock signal, or the like to drive the pixels 10 on a row basis. Each column signal line 102 is provided for each column of the pixels 10, and the pixels 10 on the same column output pixel signals VL to a common column signal line 102.

The amplifier unit 2 has column amplifier units 20 on a column basis. Each of the column amplifier units 20 has an operational amplifier, and the operational amplifier is capable of changing the gain. The column amplifier unit 20 performs analog amplification on the pixel signal VL output to the column signal line 102 and outputs a signal Vamp.

The comparator unit 3 has column comparator units 30 and determination circuits 35 on a column basis. Each of the column comparator units 30 is input with the signal Vamp, compares the signal Vamp with a reference signal Vr, and outputs a comparison signal Vcmp representing a comparison result. Each of the determination circuits 35 outputs a determination signal ATT based on the comparison signal Vcmp representing a result of comparison in the determination period described later. The determination signal ATT is fed back and input to the column amplifier unit 20, and the column amplifier unit 20 is capable of changing an amplification factor (gain) based on the determination signal ATT. The reference signal generation unit 6 has a counter, a digital-to-analog converter circuit, or the like and generates the reference signal Vr that is a ramp signal changing with the lapse of time. The reference signal generation unit 6 may generate a ramp signal by using various schemes such as a capacitive charge/discharge scheme, a DAC scheme, a current steering scheme, or the like. The reference signal Vr may be not only an upslope signal whose level increases with the lapse of time but also a downslope signal whose level decreases with the lapse of time. The counter 7 generates a counter value that is counted up or counted down in synchronization with the reference signal Vr. The comparator unit 3, the reference signal generation unit 6, and the counter 7 form a slope-type AD converter unit that uses the reference signal Vr as a comparing signal.

The memory unit 4 has column memories 40 on a column basis, and each of the column memories 40 has a J-memory 401, an N-memory 402, and an S-memory 403. The J-memory 401 stores the determination signal ATT output from the determination circuit 35. The count value from the counter 7 and the comparison signal Vcmp from the column comparator unit 30 are input to the N-memory 402 and the S-memory 403. The N-memory 402 stores, at a timing of transition of the comparison signal Vcmp, the count value obtained at the time of reset of the pixel 10. Further, the S-memory 403 stores, at a timing of transition of the comparison signal Vcmp, the count value obtained at the time of photoelectric conversion of the pixel 10.

The horizontal scanning circuit 8 has decoders and shift registers, sequentially reads out the count value held in the memory unit 4 as a digital signal, and outputs the digital signal to the signal processing unit 105. The signal processing unit 105 has a digital signal processor and performs digital signal processing such as digital gain, digital correlated double sampling, digital offset, linearity correction, or the like. Further, the signal processing unit 105 has a serial output circuit of a low voltage differential signaling (LVDS) scheme and outputs signal-processed digital signals to the outside of the solid state imaging device at a high speed and low power consumption.

The timing generator circuit 9 generates various control signals and drive signals based on a clock, a synchronization signal, or the like to control the comparator unit 3, the memory unit 4, the vertical scanning circuit 5, the reference signal generation unit 6, the counter 7, and the horizontal scanning circuit 8.

Figure 2:
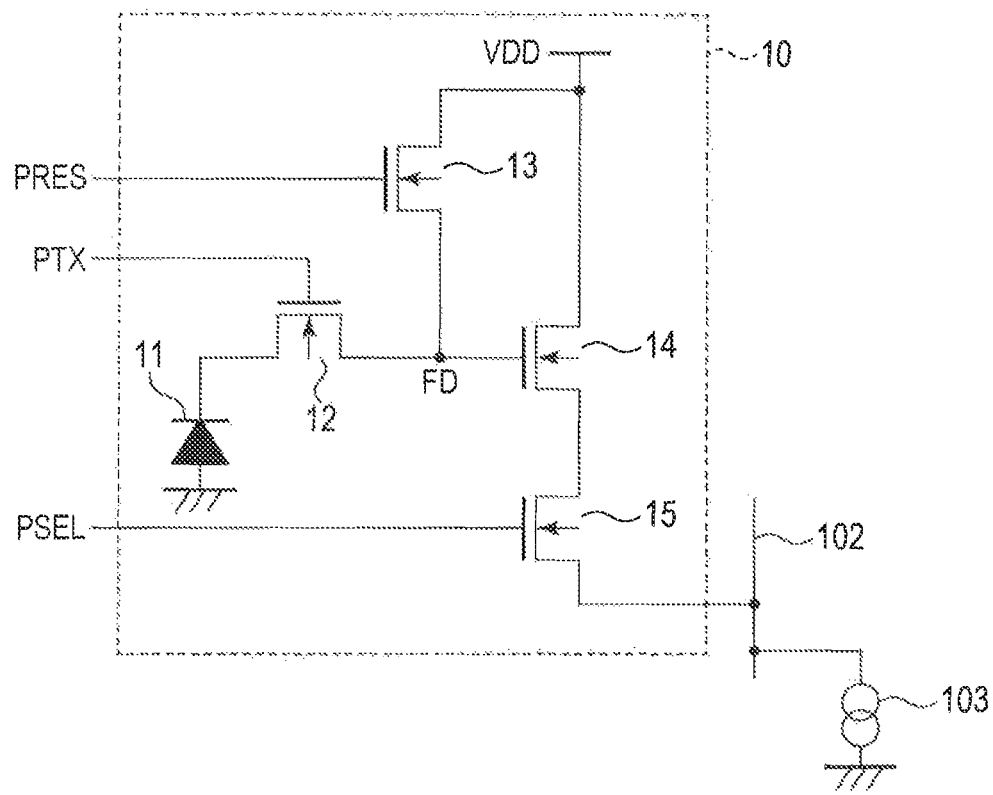
FIG. 2 is a diagram illustrating a configuration example of a pixel in the first embodiment.

FIG. 2 is a diagram illustrating a configuration example of the pixel 10 in the present embodiment. The pixel 10 includes a photoelectric conversion unit 11, a transfer transistor 12, a floating diffusion region FD, a reset transistor 13, an amplification transistor 14, and a selection transistor 15. In the following description, an example in which each transistor forming the pixel 10 is an N-channel MOS transistor will be described. The photoelectric conversion unit 11 is formed of a photodiode, for example, and performs photoelectric conversion caused by an incident light and accumulation of charges. Note that the photoelectric conversion unit 11 is not limited to a photodiode, but may be a material that causes a photoelectric effect. Also, the number of photoelectric conversion units 11 per the pixel 10 is not limited, but two or four or more photoelectric conversion units 11 may be provided so as to share a single micro lens. Furthermore, when an embedded type photodiode is formed, dark current noise can be reduced. A micro lens is provided over the photoelectric conversion unit 11, and a light collected by the micro lens enters the photoelectric conversion unit 11.

The transfer transistor 12 is provided correspondingly to the photoelectric conversion unit 11, and a control signal PTX is applied to the gate thereof from the vertical scanning circuit 5. When the control signal PTX becomes a high level, the transfer transistor 12 is turned on (conductive state), and signal charges accumulated in the photoelectric conversion unit 11 are transferred to the floating diffusion region FD formed at the gate of the amplification transistor 14. Further, when the control signal PTX becomes a low level, the transfer transistor 12 is turned off (non-conductive state). Turning on or off of the transfer transistor 12 allows signal charges of the photoelectric conversion unit 11 to be transferred to the floating diffusion region FD. The floating diffusion region FD converts signal charges into a voltage, and the amplification transistor 14 outputs a signal voltage in accordance with the gate voltage from the source to the column signal line 102 via the selection transistor 15. The drain of the amplification transistor 14 is connected to a power source voltage VDD.

The source of the reset transistor 13 is connected to the floating diffusion region FD, the drain is connected to the power source voltage VDD, and a control signal PRES is applied to the gate from the vertical scanning circuit 5. When the control signal PRES becomes a high level, the reset transistor 13 is turned on, and the power source voltage VDD is supplied to the floating diffusion region FD. The selection transistor 15 is provided between the amplification transistor 14 and the column signal line 102, and a control signal PSEL is applied to the gate of the selection transistor 15 from the vertical scanning circuit 5. When the control signal PSEL becomes a high level, the amplification transistor 14 and the column signal line 102 are electrically conducted to each other. A current source 103 is electrically connected to the column signal line 102, and the current source 103 supplies a constant bias current to the source of the amplification transistor 14 via the column signal line 102.

Figure 3:
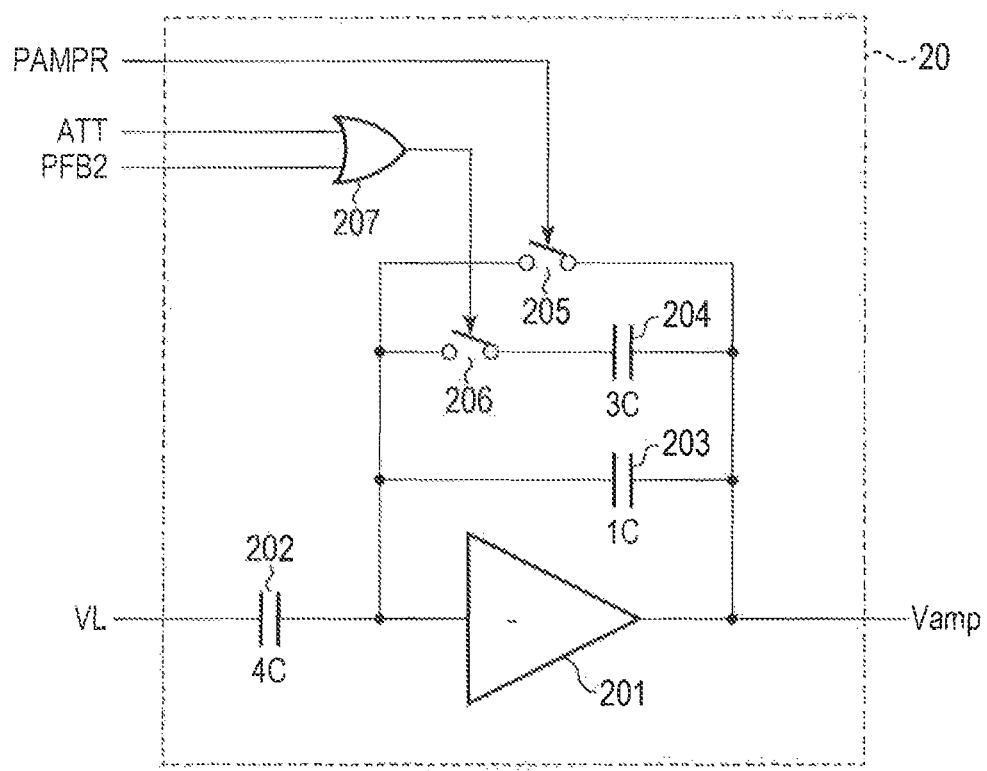
FIG. 3 is a diagram illustrating a configuration example of a column amplifier unit in the first embodiment.

FIG. 3 is a diagram illustrating a configuration example of the column amplifier unit 20 in the present embodiment. The column amplifier unit 20 includes an operational amplifier 201, an input capacitor 202, feedback capacitors 203 and 204, switches 205 and 206, and an OR circuit 207 and forms a switched capacitor amplifier circuit. The operational amplifier 201 is formed of a differential amplifier circuit or the like, and the pixel signal VL is input to the inverting input terminal via the input capacitor 202. A predetermined bias voltage is applied to the non-inverting input terminal (not illustrated), and the signal Vamp is output from the output terminal. The feedback capacitors 203 and 204 are connected in parallel between the output terminal and the inverting input terminal of the operational amplifier 201. The feedback capacitor 204 is connected to the inverting input terminal via the switch 206 used for gain switching. When the capacitance of the feedback capacitor 203 is defined as 1C, the capacitance of the feedback capacitor 204 will be 3C, and the capacitance of the input capacitor 202 will be 4C. The switch 206 is formed of a MOS transistor, the gate of the switch 206 is connected to the output terminal of the OR circuit 207. The determination signal ATT from the determination circuit 35 and a control signal PFB2 from the timing generator circuit 9 are input to the OR circuit 207.

When at least one of the determination signal ATT and the control signal PFB2 becomes a high level, the switch 206 is turned on, and the feedback capacitor 204 is electrically connected to the inverting input terminal of the operational amplifier 201. Since sum of the feedback capacitances is now 4C, the amplification factor of the column amplifier unit 20 is 4C/4C=1. When the switch 206 is turned off, since the feedback capacitance is 1C of the feedback capacitor 203, the amplification factor of the column amplifier unit 20 is 4C/1C=4. The switch 205 is formed of a MOS transistor, a control signal PAMPR is input to the gate of the switch 205 from the timing generator circuit 9. Once the switch 205 is turned on, the inverting input terminal and the output terminal of the operational amplifier 201 are conducted. Thereby, the feedback capacitors 203 and 204 are reset, and the pixel signal VL is clamped at the input capacitor 202.

Figure 4:
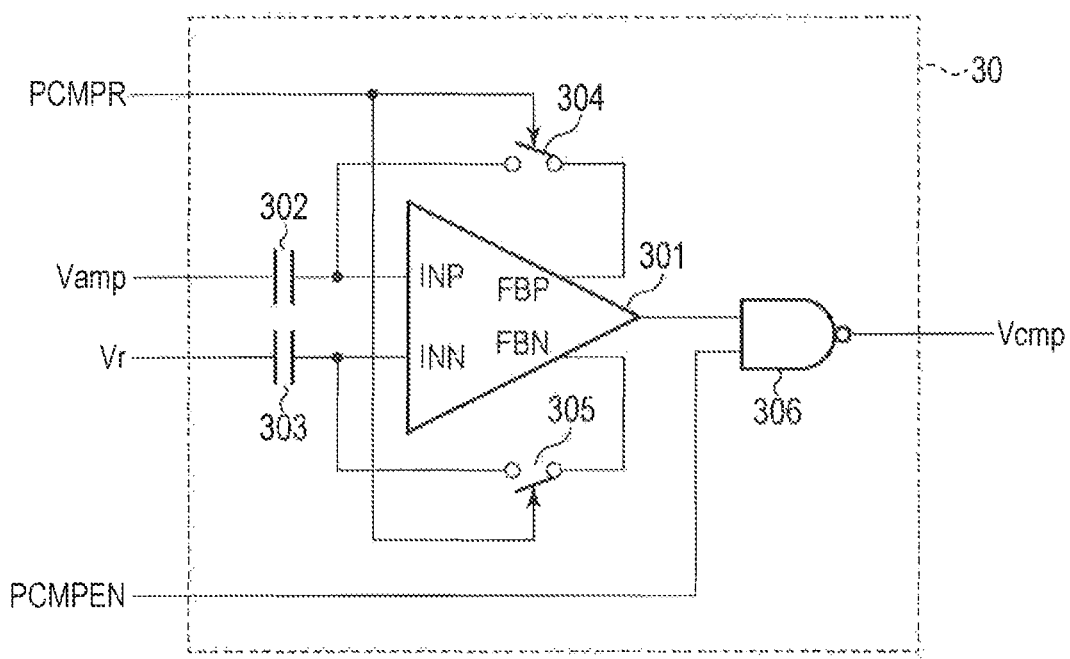
FIG. 4 is a diagram illustrating a configuration example of a column comparator unit in the first embodiment.

FIG. 4 is a diagram illustrating a configuration example of the column capacitor unit 30 in the present embodiment. The column comparator unit 30 has a differential amplifier 301, input capacitors 302 and 303, reset switches 304 and 305, and an NAND circuit 306. The signal Vamp is input to the non-inverting input terminal INP of the differential amplifier 301 via the input capacitor 302, and the reference signal Vr is input to the inverting input terminal INN via the input capacitor 303. The switch 304 formed of a MOS transistor is connected between the non-inverting input terminal INP and the non-inverting output terminal FBP, and the switch 305 formed of a MOS transistor is connected between the inverting input terminal INN and the inverting output terminal FBN. A control signal PCMPR from the timing generator circuit 9 is input to respective gates of the switches 304 and 305. When the control signal PCMPR becomes a high level, the switches 304 and 305 are turned on, the non-inverting input terminal INP is conducted to the non-inverting output terminal FBP, and the inverting input terminal INN is conducted to the inverting output terminal FBN. Thereby, the offset of the differential amplifier 301 is fed back to the input capacitors 302 and 303, and an auto-zero operation is performed. The differential amplifier 301 compares the signal Vamp with the reference signal Vr and outputs a high-level signal or a low-level signal. The NAND circuit 306 is input with a signal from the differential amplifier 301 and a control signal PCMPEN from the timing generator circuit 9 to output the comparison signal Vcmp.

Figure 5:
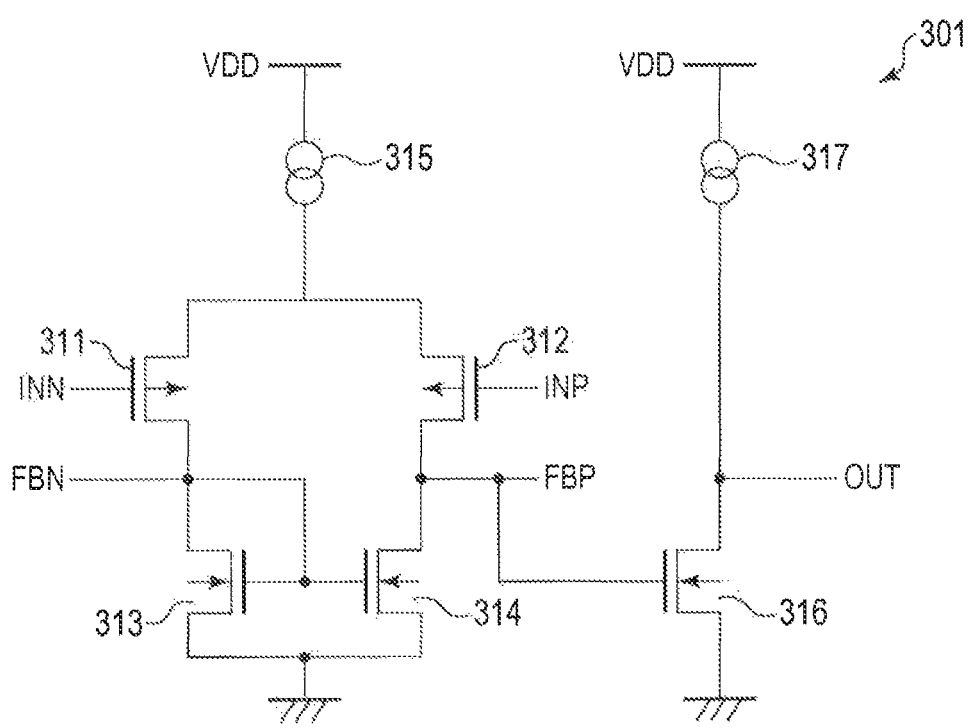
FIG. 5 is a diagram illustrating a configuration example of a differential amplifier in the first embodiment.

FIG. 5 is a diagram illustrating a configuration example of the differential amplifier 301. The differential amplifier 301 has a two-stage operational amplifier formed of a differential stage and a source ground stage. The differential stage has P-channel MOS transistors 311 and 312, N-channel MOS transistors 313 and 314, and a constant current source 315, and the source ground stage has an N-channel MOS transistor 316 and a constant current source 317. In the differential stage, the transistors 311 and 312 form a differential pair, the gate of the transistor 311 configures the inverting input terminal INN, and the source configures the inverting output terminal FBN. The gate of the transistor 312 configures the non-inverting input terminal INP, and the source configures the non-inverting output terminal FBP. The transistors 313 and 314 configure a current mirror circuit, the transistor 313 is connected to the transistor 311, and the transistor 314 is connected to the transistor 312. The constant current source 315 is connected between the transistors 311 and 312 and the power source voltage VDD. In the source ground stage, the gate of the transistor 316 is connected to the non-inverting output terminal FBP. Further, the drain of the transistor 316 is grounded, and the source is connected to the power source voltage VDD via the constant current source 317.

Figure 6:
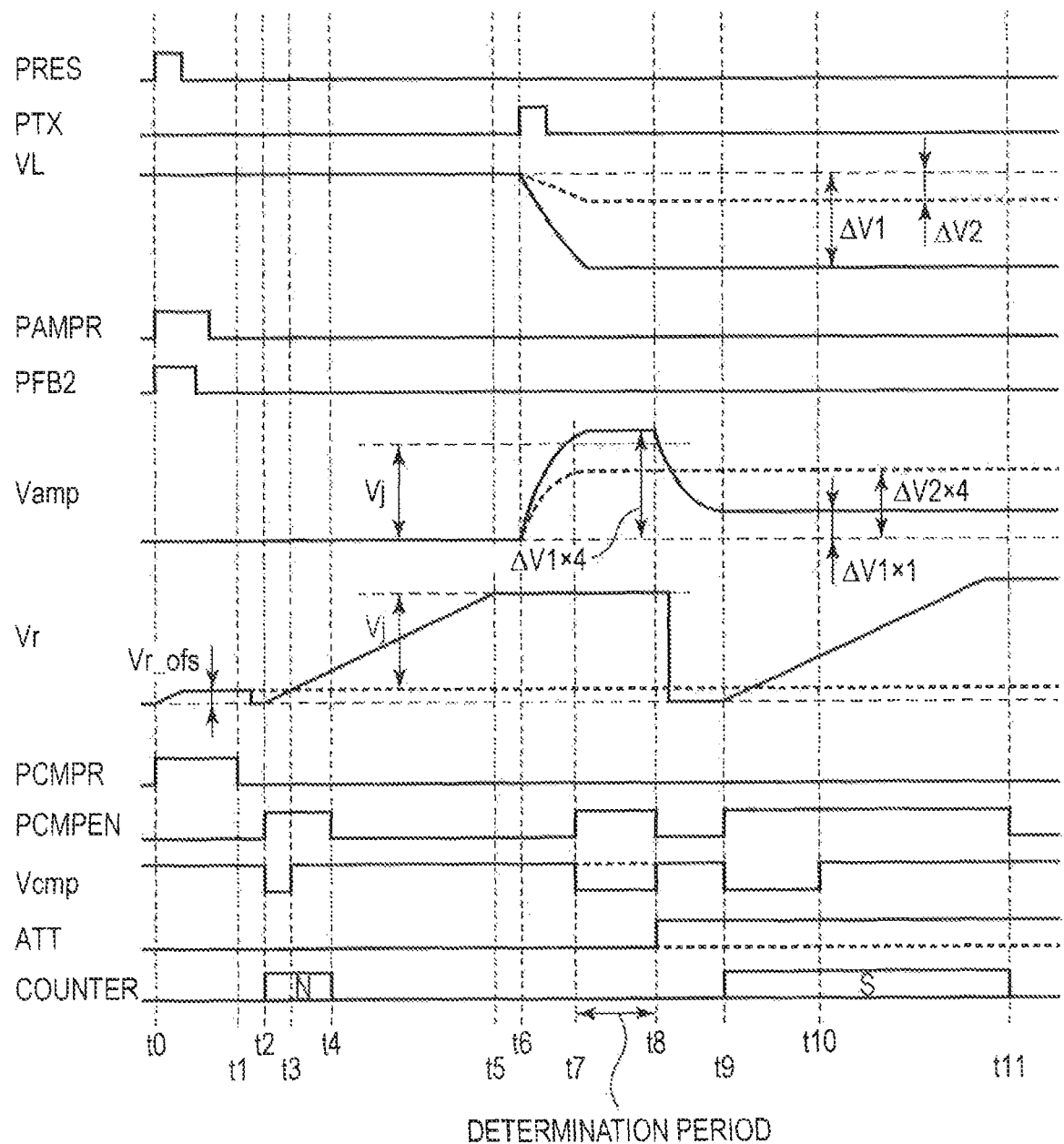
FIG. 6 is a timing chart illustrating a drive method of the solid state imaging device in the first embodiment.

Next, the operation of the solid state imaging device in the present embodiment will be described. FIG. 6 is a timing chart illustrating a drive method of the solid state imaging device in the present embodiment. When each control signal is at a high level, the corresponding transistor is turned on, and when each control signal is at a low level, the corresponding transistor is turned off.

At time t0, the control signals PRES, PAMPR, PFB2, and PCMPR transition from a low level to a high level. In the pixel 10, once the control signal PRES becomes a high level, the reset transistor 13 is turned on, and the floating diffusion region FD is reset to the power source voltage VDD. At this time, the selection transistor 15 is already turned on, and the source of the amplification transistor 14 is in electrical connection to the column signal line 102 via the selection transistor 15. The control signal PRES transitions from the high level to the low level, and the pixel signal VL at the time of reset is output. After the reset transistor 13 is turned off, a reset noise is included in the voltage of the floating diffusion region FD. Therefore, the pixel signal VL includes the reset noise. In the column amplifier unit 20, the control signal PAMPR becomes a high level, the switch 205 is turned on, the feedback capacitors 203 and 204 are reset, and the pixel signal VL is clamped at the input capacitor 202. Then, the control signal PFB2 changes from a high level to a low level, the amplification factor of the column amplifier unit 20 is 4C/1C=4. Subsequently, the control signal PAMPR changes from the high level to the low level, and the reset operation in the column amplifier unit 20 ends. In the column comparator unit 30, the control signal PCMPR becomes a high level, and the switches 304 and 305 are turned on. Thereby, the offset of the differential amplifier 301 is fed back to the input capacitors 302 and 303, and an auto-zero operation is performed. At this time, the reference signal generation unit 6 increases the reference signal Vr by an offset Vr_ofs relative to the reference level. Further, the control signal PCMPEN is at a low level, and the comparison signal Vcmp from the NAND circuit 306 of the column comparator unit 30 is maintained at a high level.

At time t1, the control signal PCMPR changes from the high level to the low level, and the auto-zero operation in the column comparator unit 30 ends. Then, the reference signal generation unit 6 turns the reference signal Vr back to the reference level. Thereby, the potential of the inverting input terminal INN of the differential amplifier 301 decreases by the offset Vr_ofs and becomes lower than the signal Vamp obtained at the time of reset.

The period of time t2 to t4 is an N_AD conversion period (first period) of a signal (first pixel signal) Vamp obtained at the time of reset of the pixel 10. In the N_AD conversion period, the control signal PCMPEN changes from the low level to the high level, and the comparison signal Vcmp can be output from the NAND circuit 306 of the column comparator unit 30. Further, in the N_AD conversion period, a counter value from the counter 7 is supplied to the column memory 40, and the reference signal Vr is input to the column comparator unit 30.

At the time t2, the reference signal generation unit 6 increases the reference signal Vr from the reference level at a constant change rate with respect to the lapse of time. In the present embodiment, the change rate of the reference signal Vr is a constant slope α with respect to the lapse of time. At the same time as the start of increase of the reference signal Vr, the counter 7 starts a count operation. If the reference signal Vr is smaller than the signal Vamp, the column comparator unit 30 outputs a low-level comparison signal Vcmp.

At the time t3, in response to the inversion of the level relationship between the reference signal Vr and the signal Vamp, the column comparator unit 30 changes the comparison signal Vcmp from the low level to the high level. The column memory 40 latches a counter value at the time when the comparison signal Vcmp transitions from the low level to the high level and stores the counter value as a first digital signal in the N-memory 402.

At the time t4, the control signal PCMPEN transitions from the high level to the low level, and the N_AD conversion period ends. During the period from the time t4 to time t5, the reference signal generation unit 6 continues to change the reference signal Vr at a constant slope (change rate) α with respect to the lapse of time.

At time t5, the reference signal generation unit 6 stops increasing the reference signal Vr to set the reference signal Vr to be a determination level (threshold) Vj that is higher by the potential Vj than the offset Vr_ofs. It is preferable that the determination level Vj be greater than or equal to 60% and less than or equal to 100% with respect to the saturation level of a signal output by the column amplifier unit 20.

At time t6, the control signal PTX changes from the low level to the high level, and the transfer transistor 12 of the pixel 10 is turned on. Charges accumulated in the photoelectric conversion unit 11 are transferred to the floating diffusion region FD, and the potential of the floating diffusion region FD decreases in accordance with charges. The amplification transistor 14 outputs the pixel signal VL in accordance with the potential of the floating diffusion region FD to the column signal line 102 via the transfer transistor 12. Then, the control signal PTX transitions from the high level to the low level, and the transfer transistor 12 is turned off.

The period of time t7 to t8 is a determination period for comparing the signal (second pixel signal) Vamp obtained at the time of photoelectric conversion with the determination level Vj. In the determination period, the control signal PCMPEN becomes a high level, and the column comparator unit 30 is able to output the comparison signal Vcmp. The column comparator unit 30 compares the signal (second pixel signal) Vamp obtained at the time of photoelectric conversion with the determination level Vj and outputs the comparison signal Vcmp. When a change in the potential of the pixel signal VL is defined as ΔV1, the signal Vamp output from the column amplifier unit 20 will be (ΔV1×4). If the signal Vamp is larger than the determination level Vj, that is, if a relational equation (ΔV1×4>Vj) is established, the column comparator unit 30 outputs a low-level comparison signal Vcmp. On the other hand, when a change in the potential of the pixel signal VL is defined as ΔV2, the signal Vamp output from the column amplifier unit 20 will be (ΔV2×4). If the signal Vamp is smaller than the determination level Vj, that is, if a relational equation (ΔV2×4<Vj) is established, the column comparator unit 30 outputs a high-level comparison signal Vcmp.

In the period of time t8 to t9, the determination circuit 35 determines the level of the determination signal ATT based on the comparison signal Vcmp. When the comparison signal Vcmp is at a low level, that is, if the signal Vamp is larger than the determination level Vj, the determination circuit 35 sets the determination signal ATT to a high level. On the other hand, when the comparison signal Vcmp is at a high level, that is, if the signal Vamp is smaller than the determination level Vj, the determination circuit 35 maintains the determination signal ATT at the low level. The determination circuit 35 feeds back the determination signal ATT to the column amplifier unit 20, and the column amplifier unit 20 sets a gain based on the determination signal ATT. When the determination signal ATT is at a high level, the switch 206 is turned on and thereby the feedback capacitance is 4C, and therefore the gain of the column amplifier unit 20 is reduced from four-fold to one-fold. When the determination signal ATT is at a low level, the switch 206 is turned off and thereby the feedback capacitance is 1C, and therefore the gain of the column amplifier unit 20 is maintained at four-fold. Further, the determination signal ATT is stored in the J-memory 401 of the column memory 40. After a predetermined time has elapsed from the time t8, the reference signal generation unit 6 turns the reference signal Vr back to the reference level from the determination level Vj.

The period of time t9 to t11 is an S_AD conversion period (second period) of the signal (second pixel signal) Vamp obtained at the time of photoelectric conversion. In the S_AD conversion period, the control signal PCMPEN changes from the low level to the high level, and the comparison signal Vcmp is able to be output from the NAND circuit 306 of the column comparator unit 30. Further, in the S_AD conversion period, the counter value from the counter 7 is supplied to the column memory 40, and the reference signal Vr is input to the column comparator unit 30.

At the time t9, the reference signal generation unit 6 starts changing the reference signal Vr at a constant change rate with respect to the lapse of time, that is, a constant slope α with respect to the lapse of time. At the same time as the start of increase of the reference signal Vr, the counter 7 starts a count operation. If the reference signal Vr is smaller than the signal Vamp, the column comparator unit 30 outputs a low-level comparison signal Vcmp. The pixel signal VL is already amplified by the column amplifier unit 20 at an optimum gain in accordance with the amplitude of the pixel signal VL. That is, the signal Vamp is now (ΔV1×1) or (ΔV2×4). The column comparator unit 30 outputs the comparison signal Vcmp based on the level relationship between the signal Vamp and the reference signal Vr.

At the time t10, in response to the inversion of the level relationship between the signal Vamp and the reference signal Vr, the column comparator unit 30 causes the comparison signal Vcmp to transition from the low level to the high level. The column memory 40 latches a counter value at the time when the comparison signal Vcmp transitions from the low level to the high level and stores the count value as a second digital signal in the S-memory 403.

On and after the time t11, the horizontal scanning circuit 8 scans data stored in the J-memory 401, the N-memory 402, and the S-memory 403 on each column and transfers the data to the signal processing unit 105. The signal processing unit 105 can also perform a digital gain process and a correlated double sampling process on the second digital signal transferred from the S-memory 403 on the same column based on the data transferred from the J-memory 401.

In the present embodiment described above, the reference signal generation unit 6 changes the reference signal Vr in only the increasing direction until the reference signal Vr reaches the determination level Vj from the N_AD conversion period at the time of reset. That is, the reference signal Vr increases up to the determination level Vj without decreasing from the level at the end of the N_AD conversion period and without changing the direction of change. Thus, the reference signal Vr can be set to the determination level Vj without causing a time loss, which enables fast AD conversion to be realized. Further, it is also possible to improve the framerate in the solid state imaging device.

Further, in the present embodiment, the change rate (slope α) of the reference signal Vr with respect to the lapse of time after the N_AD conversion period ends is equal to the change rate of the reference signal Vr in the N_AD conversion period. When the drive frequency in the timing generator circuit 9 is defined as fmclk, the accuracy of the reference signal Vr will be (α/fmclk). It is therefore possible to generate the determination level Vj at the same accuracy as the accuracy (α/fmclk) of the reference signal Vr in the N_AD conversion period.

Furthermore, since the reference signal generation unit 6 is not required to start the reference signal Vr from the reference level to generate the determination level Vj, it is possible to reduce a through current or crosstalk between circuits that may occur when the reference signal Vr is reset to the reference level.

Second Embodiment

Figure 7:
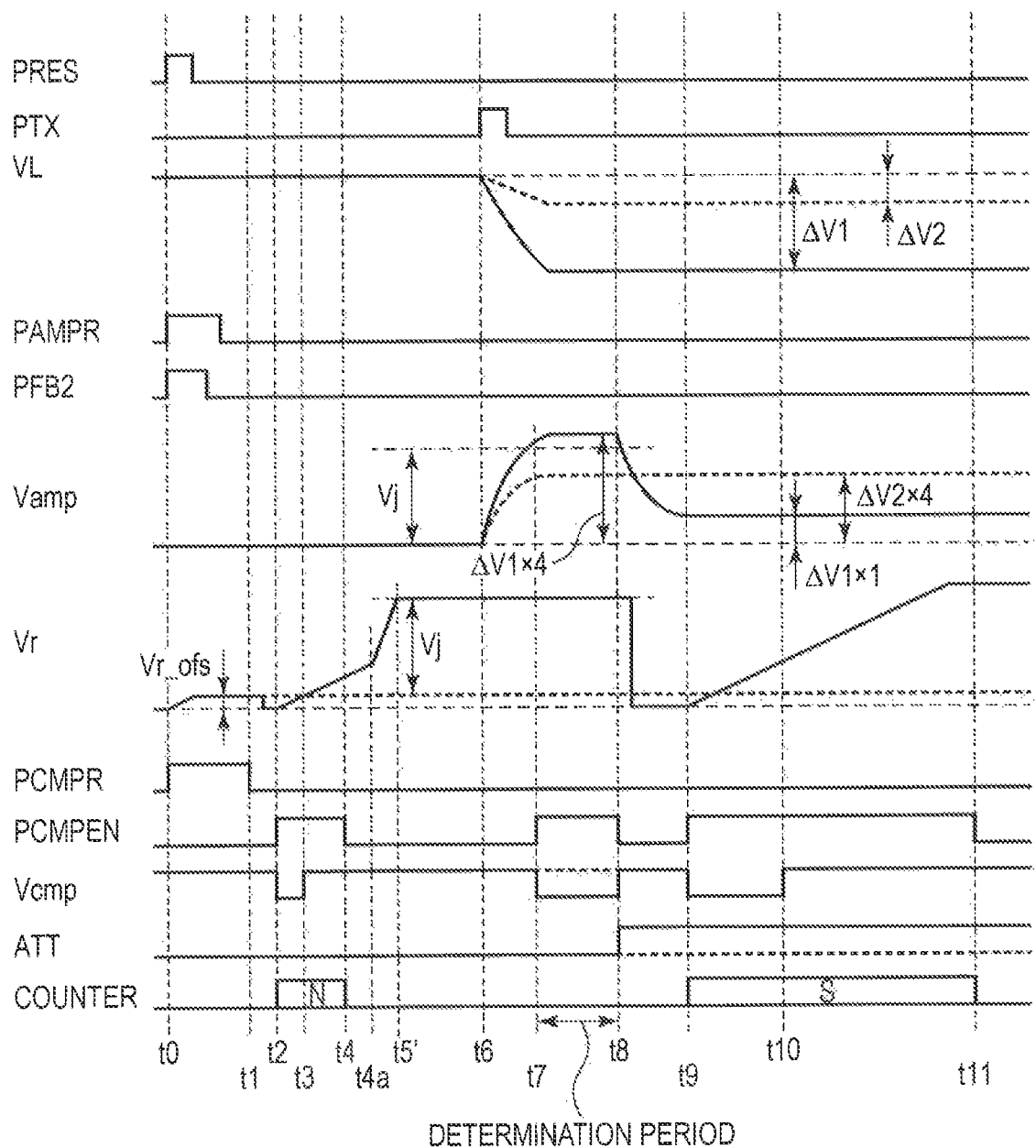
FIG. 7 is a timing chart illustrating a drive method of the solid state imaging device in a second embodiment.

Next, a solid state imaging device of a second embodiment will be described mainly for configurations different from those of the first embodiment. FIG. 7 is a timing chart illustrating a drive method of the solid state imaging device in the present embodiment.

In the period of the time t0 to t1, the pixel 10, the column amplifier unit 20, and the column comparator unit 30 are reset, and in the N_AD conversion period of the time t2 to t4, the reference signal Vr is increased from the reference level at a slope α, and N_AD conversion is performed. In the period of the time t4 to t4a, the reference signal generation unit 6 increases the reference signal Vr at the slope α. At the time t4a, the reference signal generation unit 6 changes the slope of the reference signal Vr to a slope β that is larger than the slope α. At time t5', the reference signal generation unit 6 stops increasing the reference signal Vr to set the determination level Vj that is higher by the potential Vj than the offset Vr_ofs. At the time t6, in the same manner as in the first embodiment, the determination of the level of the signal Vamp and the S_AD conversion of the signal Vamp obtained at the time of photoelectric conversion are performed. Further, in the S_AD conversion period of the time t9 to t11, based on a result of comparison of the signal Vamp in photoelectric conversion with the reference signal Vr, the signal Vamp is converted into a digital signal at a gain based on the determination signal ATT.

In the present embodiment, the reference signal generation unit 6 increases the reference signal Vr at the slope α in the N_AD conversion period and further increases the reference signal Vr up to the determination level Vj at the slope β steeper than the slope α. This enables the reference signal Vr to reach the determination level Vj at a higher speed.

Further, it is possible to adjust the accuracy of the determination level Vj by combining the accuracy at the slope α (α/fmclk) and the accuracy at the slope β (β/fmclk). Note that, while a faster operation than in the first embodiment is realized by using the slope β that is larger than the slope α in the present embodiment, the slope β may be set smaller than the slope α to increase the accuracy of the determination level Vj.

Third Embodiment

Figure 8:
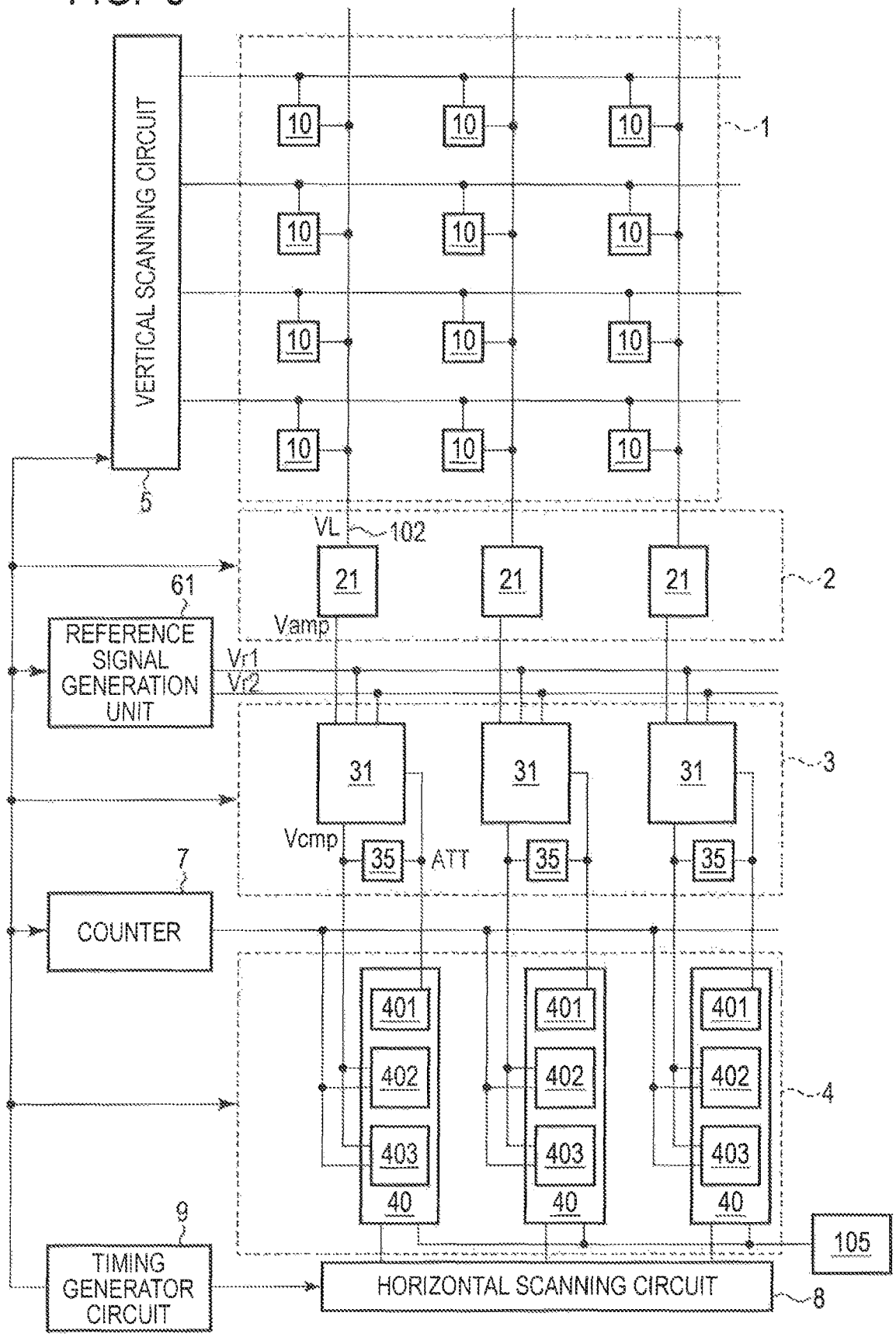
FIG. 8 is a block diagram of a solid state imaging device in a third embodiment.

Next, a solid state imaging device of a third embodiment will be described mainly for configurations different from those of the first embodiment. FIG. 8 is a block diagram of the solid state imaging device in the present embodiment. In the present embodiment, a reference signal generation unit 61 has two ramp signal generation circuits and is capable of generating reference signals Vr1 and Vr2 having different change rates. For example, the reference signal Vr1 may have a slope α, and the reference signal Vr2 has a slope β that is steeper than the slope α. The reference signals Vr1 and Vr2 are input to the column comparator unit 31 from the reference signal generation unit 61. In the present embodiment, the determination signal ATT from the determination circuit 35 is fed back and input to the column comparator unit 31. In the column amplifier unit 21, the determination signal ATT is fixed to a high level, and the amplification factor is set to one-fold (see FIG. 3).

Figure 9:
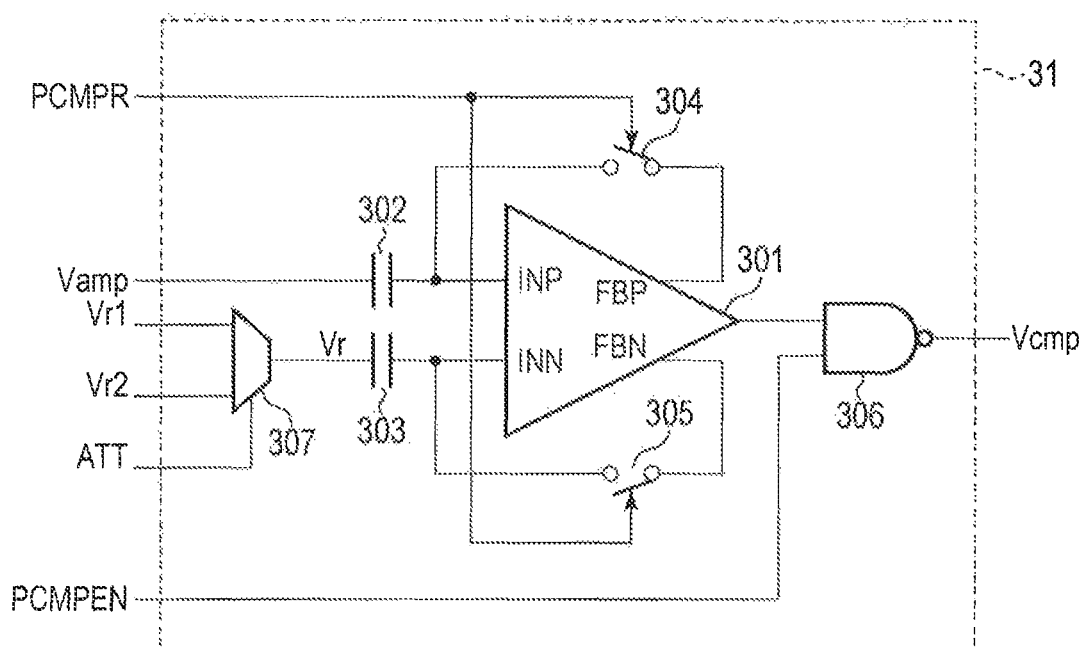
FIG. 9 is a diagram illustrating a configuration example of a column comparator unit in the third embodiment.

FIG. 9 is a diagram illustrating a configuration example of the column comparator unit 31 in the present embodiment. The column comparator unit 31 in the present embodiment further has a selector 307. The reference signals Vr1 and Vr2 and the determination signal ATT are input to the selector 307. When the determination signal AT is at a low level, the selector 307 outputs the reference signal Vr1, and when the determination signal ATT is at a high level, the selector 307 outputs the reference signal Vr2. The column comparator unit 31 uses any one of the reference signals Vr1 and Vr2 as the reference signal Vr in accordance with the level of the signal Vamp and compares the signal Vamp with the reference signal Vr.

Figure 10:
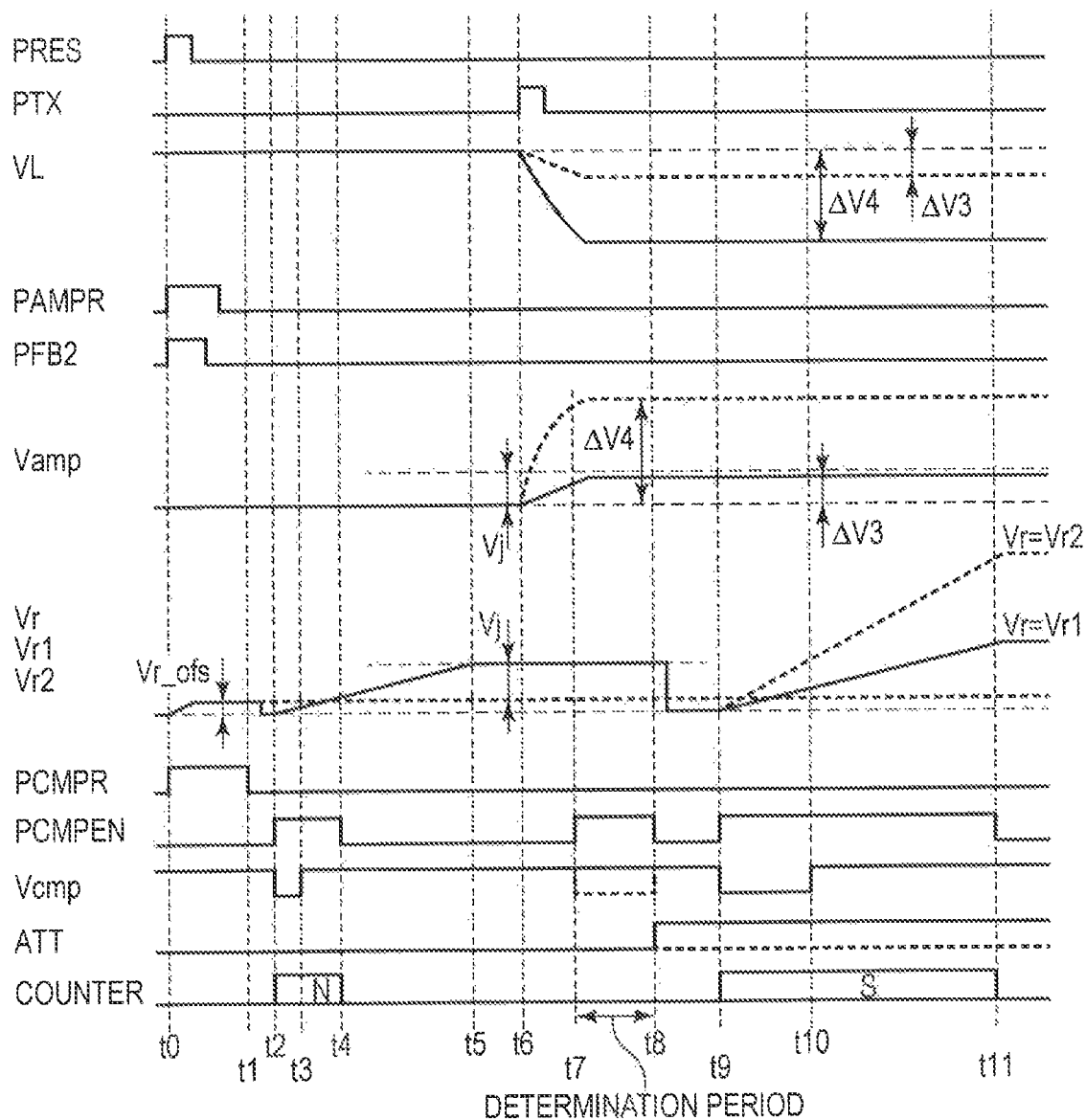
FIG. 10 is a timing chart illustrating a drive method of a solid state imaging device in the third embodiment.

FIG. 10 is a timing chart illustrating a drive method of the solid state imaging device of the present embodiment. In the same manner as in the first embodiment, in the period of the time t0 to t1, the pixel 10, the column amplifier unit 21, and the column comparator unit 31 are reset. In the N_AD conversion period of the time t2 to t4, the reference signal generation unit 61 increases the reference signal Vr from the reference level. At this time, since the determination signal ATT is at a low level, the reference signal Vr1 is selected by the selector 307 in the column comparator unit 31. At the time t3, in response to the inversion of the level relationship between the reference signal Vr and the signal Vamp, the column memory 40 stores a counter value as the first digital signal in the N-memory 402. At the time t4, the control signal PCMPEN transitions from the high level to the low level, and the N_AD conversion period ends.

In the period of the time t4 to t5, the reference signal generation unit 61 increases the reference signal Vr at the slope α. At the time t5, the reference signal generation unit 61 stops increasing the reference signal Vr to set the reference signal Vr to the determination level Vj that is higher by the potential Vj than the offset Vr_ofs.

At the time t6, the control signal PTX transitions from the low level to the high level, and the transfer transistor 12 of the pixel 10 is turned on. Charges accumulated in the photoelectric conversion unit 11 are transferred to the floating diffusion region FD, and the pixel signal VL in accordance with the potential of the floating diffusion region FD is output to the column signal line 102. Then, the control signal PTX transitions from the high level to the low level, and the transfer transistor 12 is turned off. The column amplifier unit 21 reads out the pixel signal VL from the column signal line 102 and outputs the signal Vamp at the amplification factor of one-fold.

In the determination period of the time t7 to t8, the column comparator unit 31 determines the level of the signal Vamp obtained at the time of photoelectric conversion. That is, the column comparator unit 31 compares the signal Vamp with the determination level Vj and outputs the comparison signal Vcmp. When the change in the potential of the pixel signal VL is defined as $\Delta V3$, the signal Vamp output from the column amplifier unit 21 will be ($\Delta V3 \times 1$). If the signal Vamp is larger than the determination level Vj, that is, if the relational equation ($\Delta V3 > Vj$) is established, the column comparator unit 31 outputs a low-level comparator signal Vcmp. On the other hand, when the change in the potential of the pixel signal VL is defined as $\Delta V4$, the signal Vamp output from the column amplifier unit 21 will be ($\Delta V4 \times 1$). If the signal Vamp is smaller than the determination level Vj, that is, if the relational equation ($\Delta V4 < Vj$) is established, the column comparator unit 31 outputs a high-level comparison signal Vcmp.

In the period of the time t8 to t9, the determination circuit 35 determines the level of the determination signal ATT based on the comparison signal Vcmp. When the comparison signal Vcmp is at a low level, that is, if the signal Vamp is larger than the determination level Vj, the determination circuit 35 sets the determination signal ATT to a high level. On the other hand, when the comparison signal Vcmp is at a high level, that is, if the signal Vamp is smaller than the determination level Vj, the determination circuit 35 maintains the determination signal ATT at the low level. The determination circuit 35 feeds back the determination signal ATT to the column comparator unit 31, and the comparator unit 31 selects any one of the reference signals Vr1 and Vr2 based on the determination signal ATT. When the determination signal ATT is at a low level, the selector 307 selects the reference signal Vr2, and when the determination signal ATT is at a high level, the selector 307 selects the reference signal Vr1. Further, the determination signal ATT is stored in the J-memory 401 of the column memory 40.

In the S_AD conversion period of the time t9 to t11, the column comparator unit 31 and the counter 7 perform the S_AD conversion on the signal Vamp obtained at the time of photoelectric conversion. The reference signal generation unit 61 increases the reference signals Vr1 and Vr2 from the reference level. If the signal Vamp is smaller than the determination level Vj, the column comparator unit 31 compares the reference signal Vr1 having the slope α with the signal Vamp. If the signal Vamp is larger than the determination level Vj, the column comparator unit 31 compares the reference signal Vr2 having the slope β with the signal Vamp. With the slope β being larger than the slope α, the ramp gain can be reduced. At the time t10, in response to the inversion of the level relationship between the signal Vamp and the reference signal Vr1 or Vr2, the column comparator unit 31 causes the comparator signal Vcmp to transition from the low level to the high level. The column memory 40 latches a counter value when the comparator signal Vcmp transitions from the low level to the high level and stores the counter value as the second digital signal in the S-memory 403.

On and after the time t11, the horizontal scanning circuit 8 scans data stored in the J-memory 401, the N-memory 402, and the S-memory 403 on each column and transfers the data to the signal processing unit 105. The signal processing unit 105 can also perform a digital gain process and a correlated double sampling process on the second digital signal transferred from the S-memory 403 on the same column based on the data transferred from the J-memory 401.

Also in the present embodiment, the reference signal generation unit 6 sets the reference signal Vr to the determination level Vj by changing the reference signal Vr in only the increasing direction from the N_AD conversion period. It is therefore possible to allow the reference signal Vr to reach the determination level Vj without causing a time loss, which enables fast AD conversion to be realized.

Further, in the present embodiment, the ramp gain is changed by using the reference signals Vr and Vr2 having different slopes while maintaining the amplification factor constant in the column amplifier unit 21. The pixel signal VL may be input to the column comparator unit 31 without the signal Vamp from the column amplifier unit 21 being input to the column comparator unit 31.

Fourth Embodiment

Figure 11:
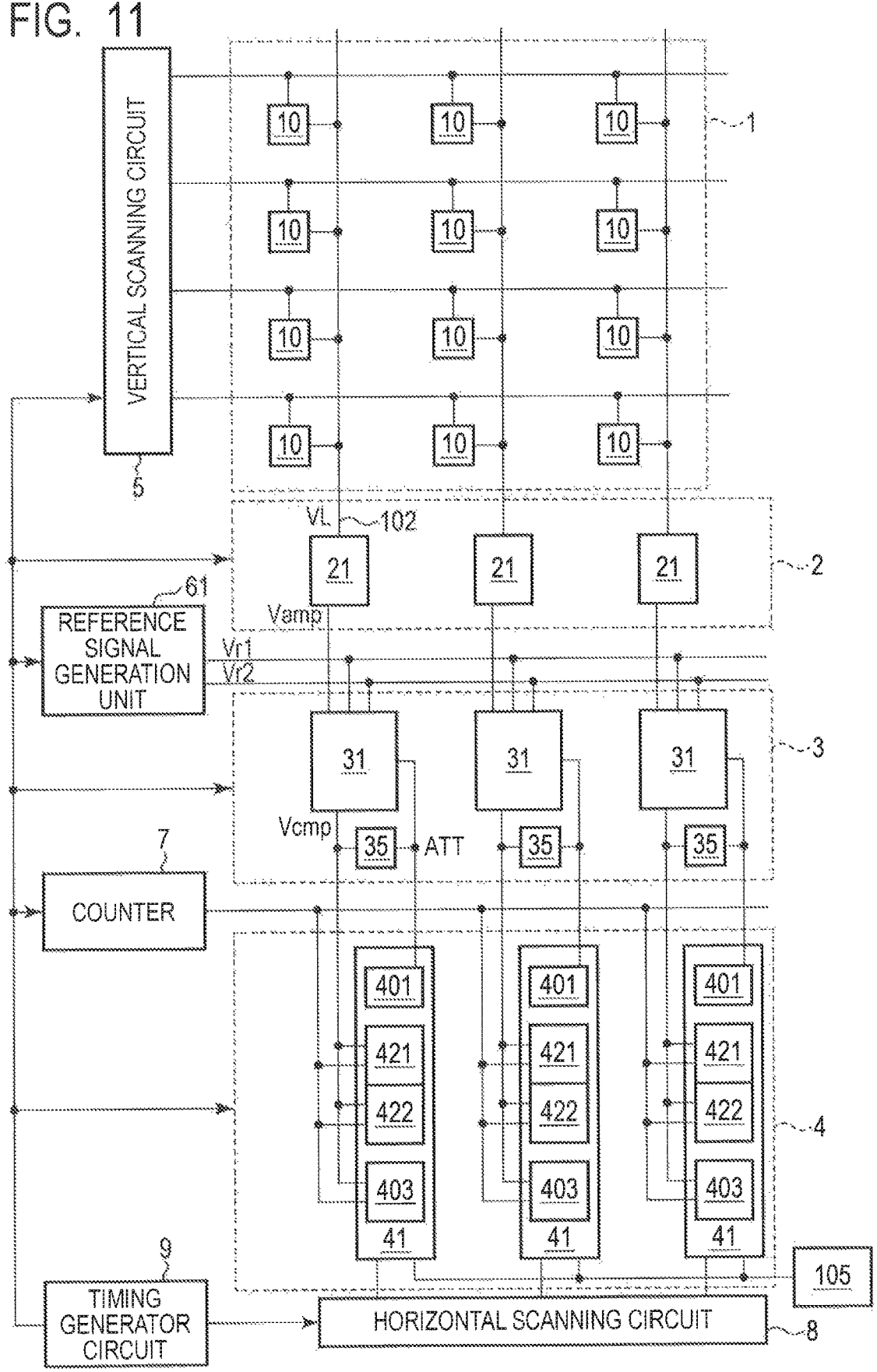
FIG. 11 is a block diagram of a solid state imaging device in a fourth embodiment.

Next, a solid state imaging device of a fourth embodiment will be described mainly for configurations different from those of the third embodiment. FIG. 11 is a block diagram of the solid state imaging device of the present embodiment. In the present embodiment, the column memory 41 has two N-memories 421 and 422. The N-memory 421 stores a count value in a first N1_AD conversion, and the N-memory 422 stores a count value in a second N2_AD conversion.

Figure 12:
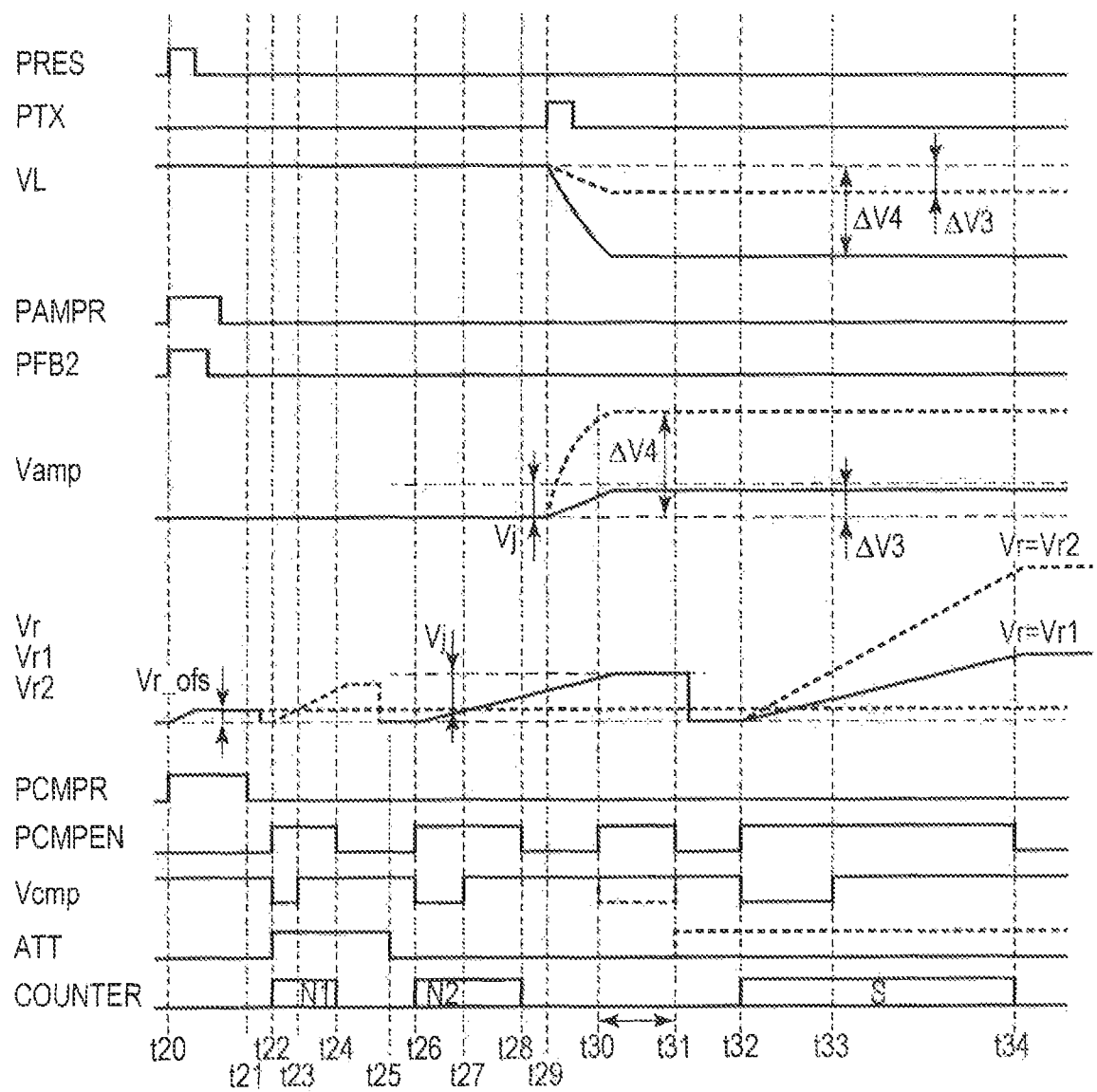
FIG. 12 is a timing chart illustrating a drive method of a solid state imaging device in the fourth embodiment.

FIG. 12 is a timing chart illustrating a drive method of the solid state imaging device in the present embodiment. In the same manner as the third embodiment, in the period of time t20 to t21, the pixel 10, the column amplifier unit 21, and the column comparator unit 31 are reset. At time t22, the control signal PCMPEN changes from the low level to the high level, and the N1_AD conversion period starts. In the N1_AD conversion period (third period) of the time t22 to t24, the reference signal generation unit 61 increases the reference signal Vr from the reference level. At this time, the timing generator circuit 9 sets the determination signal ATT to any level of the high level or the low level. In this case, unlike the third embodiment, it is assumed that the reference signal Vr2 is selected when the determination signal ATT is at a high level. The reference signal Vr2 is a ramp signal that increases from the reference level at a constant slope β. At the time t23, in response to the inversion of the level relationship between the signal Vamp and the reference signal Vr2, the column memory 41 stores a count value as a third digital signal in the N-memory 421. At the time 24, the control signal PCMPEN transitions from the high level to the low level, and the N1_AD conversion period ends.

At time t25, the timing generator circuit 9 inverts the determination signal ATT. In this case, the determination signal ATT transitions from the high level to the low level, and the selector 307 selects the reference signal Vr1 in the column comparator unit 31. In the N2_AD conversion period (first period) of time t26 to t28, the control signal PCMPEN becomes a high level. The reference signal Vr1 is a ramp signal that increases from the reference level at a constant slope α, and the slope α is smaller than the slope β of the reference signal Vr2. At the time t27, in response to the inversion of the level relationship between the signal Vamp and the reference signal Vr1, the column memory 41 stores a count value as the first digital signal in the N-memory 422. At the time t28, the control signal PCMPEN transitions from the high level to the low level, and the N2_AD conversion period ends.

The process on and after the time t28 is substantially the same as that of the third embodiment. In the period of the time t28 to t30, the reference signal generation unit 61 continues to change the reference signal Vr in the increasing direction at the constant slope α. At the time t29, the pixel signal VL at the time of photoelectric conversion is output to the column signal line 102, and the column amplifier unit 21 reads out the pixel signal VL from the column signal line 102 and outputs the signal Vamp at an amplification factor of one-fold. At the time t30, the reference signal generation unit 61 stops increasing the reference signal Vr to set the reference signal Vr to the determination level Vj that is higher by the potential Vj than the offset Vr_ofs.

In the period of the time t30 to t31, the determination circuit 35 determines the level of the determination signal ATT based on the comparison signal Vcmp. The determination circuit 35 feeds back the determination signal ATT to the column comparator unit 31, and the column comparator unit 31 selects any one of the reference signals Vr1 and Vr2 based on the determination signal ATT. When the determination signal ATT is at a low level, the selector 307 selects the reference signal Vr1, and when the determination signal ATT is at a high level, the selector 307 selects the reference signal Vr2. Further, the determination signal ATT is stored in the J-memory 401 of the column memory 40.

In the S_AD conversion period (second period) of the time t32 to t34, the column comparator unit 31 and the counter 7 perform the S_AD conversion on the signal Vamp obtained at the time of photoelectric conversion. The column comparator unit 31 performs comparison with the signal Vamp by using any one of the reference signals Vr1 and Vr2 selected based on the determination signal ATT. That is, when the determination signal ATT is at a low level, the column comparator unit 31 selects the reference signal Vr1 having the slope α. When the determination signal ATT is at a high level, the column comparator unit 31 selects the reference signal Vr2 having the slope β.

On and after the time t34, the horizontal scanning circuit 8 scans data stored in the J-memory 401, the N-memories 421 and 422, and the S-memory 403 on each column and transfers the data to the signal processing unit 105. The signal processing unit 105 can also perform a digital gain process and a correlated double sampling process on the second digital signal transferred from the S-memory 403 on the same column based on the data transferred from the J-memory 401. The signal processing unit 105 can select a digital signal of any one of the N-memories 421 and 422 on the same column based on the data transferred from the J-memory 401 and perform digital correlated double sampling on the selected digital signal with the digital signal transferred from the S-memory 402 on the same column. That is, when the S_AD conversion is performed by using the reference signal Vr1, the signal processing unit 105 performs correlated double sampling by using the third digital signal that is N_AD-converted using the reference signal Vr1. Further, when the S_AD conversion is performed by using the reference signal Vr2, the signal processing unit 105 performs correlated double sampling by using the third digital signal that is N_AD-converted using the reference signal Vr2. In such a way, by using two digital signals having the same ramp gain, it is possible to increase the accuracy in correlated double sampling.

Also in the present embodiment, the reference signal generation unit 6 sets the reference signal Vr to the determination level Vj by changing the reference signal Vr in only the increasing direction from the N_AD conversion period. It is therefore possible to allow the reference signal Vr to reach the determination level Vj without causing a time loss, which enables fast AD conversion to be realized.

Fifth Embodiment

Figure 13:
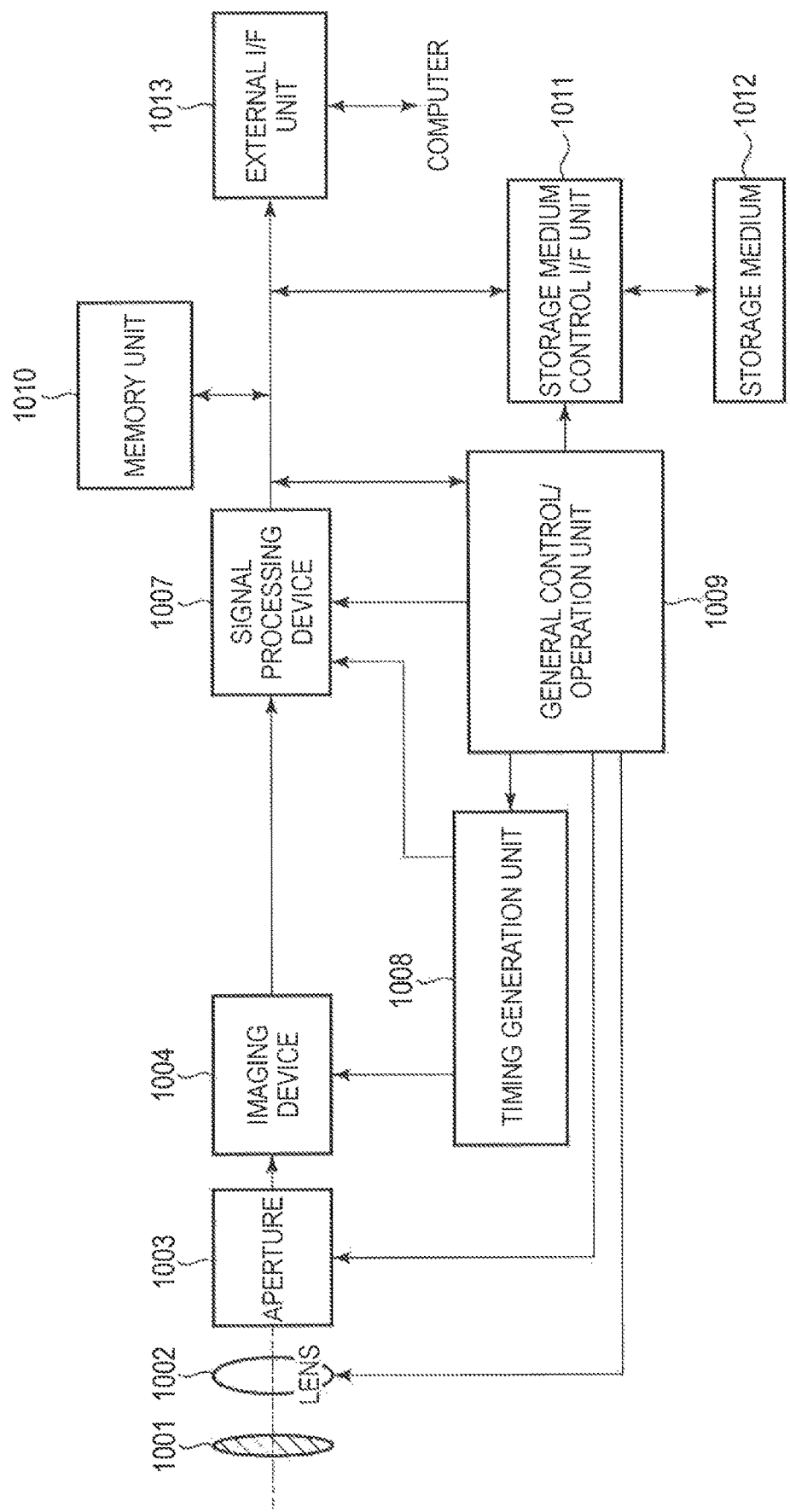
FIG. 13 is a block diagram of an imaging system in a fifth embodiment.

The solid state imaging devices of the embodiments described above can be applied to various imaging system. Such an imaging system may be a digital still camera, a digital camcorder, a camera head, a copier machine, a fax machine, a mobile phone, an on-vehicle camera, an observation satellite, a surveillance camera, or the like. FIG. 13 illustrates a block diagram of a digital still camera as an example of the imaging system.

The imaging system illustrated in FIG. 13 includes a barrier 1001, a lens 1002, an aperture 1003, an imaging device 1004, a signal processing device 1007, a timing generation unit 1008, a general control/operation unit 1009, a memory unit 1010, a storage medium control I/F unit 1011, a storage medium 1012, and an external I/F unit 1013. The barrier 1001 protects the lens 1002, and the lens 1002 captures an optical image of a subject on the imaging device 1004. The aperture 1003 changes an amount of a light that has passed through the lens 1002. The imaging device 1004 includes any one of the solid state imaging devices of the embodiments described above and converts the optical image captured by the lens 1002 into image data. The signal processing device 1007 performs various correction or data compression on the image data output from the imaging device 1004. The timing generation unit 1008 outputs various timing signals to the imaging device 1004 and the signal processing device 1007. The general control/operation unit 1009 controls the entire digital still camera, and the memory unit 1010 temporarily stores image data. The storage medium control I/F unit 1011 is an interface used for storage or readout of image data to or from the storage medium 1012, and the storage medium 1012 is a removable storage medium such as a semiconductor memory or the like used for storage or readout of captured data. The external I/F unit 1013 is an interface used for communicating with an external computer or the like. The timing signal or the like may be input from the outside of the imaging system, and the imaging system may have at least the imaging device 1004 and the signal processing device 1007 that processes an image signal output from the imaging device 1004.

In the present embodiment, the configuration in which the imaging device 1004 and the AD conversion unit are provided on the same semiconductor substrate has been described. However, the imaging device 1004 and the AD conversion unit may be formed on separate semiconductor substrates. Further, the imaging device 1004 and the signal processing device 1007 may be formed on the same semiconductor substrate.

Further, each of the pixels may have the first photoelectric conversion unit and the second photoelectric conversion unit. The signal processing device 1007 may be configured to process a pixel signal based on charges generated by the first photoelectric conversion unit and a pixel signal based on charges generated by the second photoelectric conversion unit and acquire distance information on the distance from the imaging device 1004 to a subject.

Sixth Embodiment

FIG. 14A and FIG. 14B illustrate an example of the imaging system related to an on-vehicle camera of a sixth embodiment of the present invention. The imaging system 2000 has an imaging device 1004 of any one of the embodiments described above. The imaging system 2000 has an image processing unit 2030 that performs image processing on a plurality of image data acquired by the imaging device 1004 and a parallax calculation unit 2040 that calculates a parallax (a phase difference of parallax images) from the plurality of image data acquired by the imaging system 2000. Further, the imaging system 2000 has a distance measurement unit 2050 that calculates a distance to the object based on the calculated parallax and a collision determination unit 2060 that determines whether or not there is a collision possibility based on the calculated distance. Here, the parallax calculation unit 2040 and the distance measurement unit 2050 are an example of a distance information acquisition unit that acquires distance information on the distance to the object. That is, the distance information is information on a parallax, a defocus amount, a distance to an object, or the like. The collision determination unit 2060 may use any of the distance information to determine the collision possibility. The distance information acquisition unit may be implemented by dedicatedly designed hardware unit or may be implemented by a software module. Further, the distance information acquisition unit may be implemented by a Field Programmable Gate Array (FPGA) or an Application Specific Integrated Circuit (ASIC) or may be implemented by combination thereof.

The imaging system 2000 is connected to the vehicle information acquisition device 2310 and can acquire vehicle information such as a vehicle speed, a yaw rate, a steering angle, or the like. Further, the imaging system 2000 is connected with a control ECU 2410, which is a control device that outputs a control signal for causing a vehicle to generate braking force based on a determination result by the collision determination unit 2060. Further, the imaging system 2000 is connected with an alert device 2420 that issues an alert to the driver based on a determination result by the collision determination unit 2060. For example, when the collision probability is high as the determination result of the collision determination unit 2060, the control ECU 2410 performs vehicle control to avoid a collision or reduce damage by applying a brake, pushing back an accelerator, suppressing engine power, or the like. The alert device 2420 alerts a user by sounding an alert such as a sound, displaying alert information on a display of a car navigation system or the like, providing vibration to a seat belt or a steering wheel, or the like. The imaging system 2000 functions as a control unit that controls the operation of controlling a vehicle as described above.

In the present embodiment, an area around a vehicle, for example, a front area or a rear area is captured by using the imaging system 2000. FIG. 14B illustrates the imaging system in a case of capturing a front area of a vehicle (a capturing area 2510). The vehicle information acquisition device 2310 as an imaging control unit transmits instructions to the imaging system 2000 or the imaging device 1004 to perform the operation described in the above first to fifth embodiments. Since the operation of the imaging device 1004 is the same as that in the first to fourth embodiments, the description thereof is omitted here. Such a configuration can further improve the ranging accuracy.

Although the example of control for avoiding a collision to another vehicle has been illustrated in the above description, the embodiment is applicable to automatic driving control for following another vehicle, automatic driving control for not going out of a traffic lane, or the like. Furthermore, the imaging system is not limited to a vehicle such as the subject vehicle, and can be applied to a moving unit (moving apparatus) such as a ship, an airplane, or an industrial robot, for example. In addition, the imaging system can be widely applied to a device which utilizes object recognition, such as an intelligent transportation system (ITS), without being limited to moving units.

Other Embodiments

The present invention is not limited to the embodiments described above, and various modification are possible. For example, embodiments of the present invention include an example in which a configuration of a part of any of the embodiments is added to another embodiment or an example in which a configuration of a part of any of the embodiments is replaced with a configuration of a part of another embodiment.

While the configuration in which the reference signal Vr increases with the lapse of time has been described as an example in the above embodiments, a configuration in which the reference signal Vr decreases with the lapse of time may be employed. Until the reference signal Vr reaches the determination level Vj from the N_AD conversion period, the reference signal Vr changes without a change in the direction of change of the reference signal with respect to the lapse of time. Also in this example, the reference signal Vr can be set to the determination level Vj fast and accurately. Therefore, any direction may be employed unless the direction of change of the reference signal is inverted and as long as the direction of either increase or decrease is maintained. Further, a period in which the reference signal Vr is constant may be included before the reference signal Vr reaches the determination level Vj from the N_AD conversion period. Also in this example, since the direction of change of the reference signal Vr is not inverted, the direction of change is not changed, and the advantageous effects of the present invention can be obtained.

Further, the gain in AD conversion of the signal Vamp in the S_AD conversion can be changed not only by using an amplifier but also by using an attenuator. That is, a gain below one-fold may be implemented based on the determination signal ATT. Further, any of an analog gain of an analog amplifier or a digital gain of a digital amplifier may be employed.

Note that each of the embodiments described above merely illustrates an embodied example in implementing the present invention, and the technical scope of the present invention is not to be construed by these embodiments. That is, the present invention can be implemented in various forms without departing from the technical concept thereof or the primary features thereof.

Advantageous Effects

According to the present invention, fast and accurate analog-to-digital conversion can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-230018, filed Nov. 30, 2017, which is hereby incorporated by reference herein in its entirety.

What is claimed is:

1. A solid state imaging device comprising:
a pixel that comprises at least one photoelectric conversion unit and a transfer transistor connected to the photoelectric conversion unit, and outputs a pixel signal corresponding to an incident light;
a reference signal generation unit that generates a reference signal that changes with the lapse of time at a predetermined change rate;
an amplifier unit that outputs, as a signal based on the pixel signal, a signal obtained by the pixel signal being amplified at a predetermined gain; and
an analog-to-digital converter unit that includes a comparator unit configured to perform a comparison of the signal based on the pixel signal output by the amplifier unit with the reference signal, and converts the signal based on the pixel signal into a digital signal based on the comparison,
wherein, in a first period, the analog-to-digital converter unit converts a signal output by the amplifier unit in which reset has been released into a first digital signal,
in a determination period after the first period, the analog-to-digital converter unit performs the comparison of the signal based on the pixel signal with the reference signal set to a predetermined threshold,
in a second period after the determination period, the amplifier unit amplifies the signal based on the pixel signal at a gain in accordance with a result of the comparison performed in the determination period,
until the reference signal reaches the threshold from the first period, the reference signal generation unit changes the reference signal without changing a direction of change of the reference signal with respect to the lapse of time,
change of voltage of the reference signal with respect to the lapse of time is continued without being interrupted until the reference signal reaches the threshold after the reference signal starts to change in the first period, and
the direction of the change of the reference signal with respect to the lapse of time is not changed until the end of the determination period from the start of the first period.

2. The solid state imaging device according to claim 1, wherein the reference signal generation unit changes the reference signal such that the change rate is constant until the reference signal reaches the threshold from the first period.

3. The solid state imaging device according to claim 1, wherein, until the reference signal reaches the threshold after the first period has elapsed, the reference signal generation unit changes the reference signal at the change rate that is larger than the change rate in the first period.

4. The solid state imaging device according to claim 1, wherein the predetermined threshold is at a signal level greater than or equal to 60□ and less than or equal to 100□ of a signal level output by the amplifier unit.

5. A solid state imaging device comprising:
a pixel comprising at least one photoelectric conversion unit and a transfer transistor connected to the photoelectric conversion unit;
a reference signal generation unit that generates at least one reference signal that changes with the lapse of time at a predetermined change rate; and
an analog-to-digital converter unit that includes a comparator unit configured to perform a comparison of the signal based on the pixel signal with the reference signal, and converts the pixel signal into a digital signal based on the comparison,
wherein, in a first period, the analog-to-digital converter unit converts a first pixel signal into a first digital signal,
in a determination period after the first period, the analog-to-digital converter unit performs the comparison of a second pixel signal with the reference signal set to a predetermined threshold,
in a second period after the determination period, the analog-to-digital converter unit converts the second pixel signal at a gain in accordance with a result of the comparison performed in the determination period into a second digital signal, until the reference signal reaches the threshold from the first period, the reference signal generation unit changes the reference signal at the change rate that is larger than the change rate in the first period without changing a direction of change of the reference signal with respect to the lapse of time, change of voltage of the reference signal with respect to the lapse of time is continued without being interrupted until the reference signal reaches the threshold after the reference signal starts to change in the first period, and the direction of the change of the reference signal with respect to the lapse of time is not changed until the end of the determination period from the start of the first period.

6. The solid state imaging device according to claim 5 further comprising an amplifier unit that performs analog amplification on the first pixel signal and the second pixel signal, wherein the gain is an analog gain in the amplifier unit.

7. The solid state imaging device according to claim 5 further comprising a signal processing unit that performs digital amplification on the first digital signal and the second digital signal, wherein the gain is a digital gain in the signal processing unit.

8. The solid state imaging device according to claim 5, wherein the gain is defined based on the change rate of the reference signal.

9. The solid state imaging device according to claim 8, wherein the reference signal generation unit is capable of generating a plurality of the reference signals having different change rates, and wherein the analog-to-digital converter unit converts the second pixel signal into the second digital signal by using any one of the plurality of reference signals in accordance with a result of the comparison in the determination period.

10. The solid state imaging device according to claim 8, wherein the reference signal generator unit is capable of changing the change rate of the reference signal, and wherein the analog-to-digital converter unit converts the second pixel signal into the second digital signal by using the reference signal having the change rate in accordance with a result of the comparison in the determination period.

11. The solid state imaging device according to claim 5, wherein the first pixel signal is the pixel signal at time of reset of the photoelectric conversion unit, and the second pixel signal is the pixel signal at time of photoelectric conversion of the photoelectric conversion unit.

12. The solid state imaging device according to claim 5, wherein, in a third period before the first period, the analog-to-digital converter unit converts the first pixel signal into a third digital signal by using the reference signal having the change rate that is different from the change rate in the first period, and wherein, in the second period, the analog-to-digital converter unit converts the second pixel signal into the second digital signal by using any one of the reference signal in the first period and the reference signal in the third period in accordance with a result of the comparison in the determination period.

13. The solid state imaging device according to claim 12, wherein the digital signal which is converted by using the reference signal having the change rate used in the second period is selected out of the first digital signal and the third digital signal, and the selected digital signal and the second digital signal are used to perform correlated double sampling.

14. A drive method of a solid state imaging device having a pixel that comprises a photoelectric conversion unit and a transfer transistor connected to the photoelectric conversion unit, and outputs a pixel signal corresponding to an incident light, a reference signal generation unit that generates a reference signal that changes with the lapse of time at a predetermined change rate, an amplifier unit that outputs, as a signal based on the pixel signal, a signal obtained by the pixel signal being amplified at a predetermined gain, and an analog-to-digital converter unit that includes a comparator unit configured to perform a comparison of the signal based on the pixel signal output by the amplifier unit with the reference signal, and converts the signal based on the pixel signal into a digital signal based on the comparison, the drive method comprising:

in a first period, converting a signal output by the amplifier unit in which reset has been released into a first digital signal;

in a determination period, performing the comparison of the signal based on the pixel signal with the reference signal set to a predetermined threshold;

in a second period after the determination period, the amplifier unit amplifying the signal based on the pixel signal at a gain in accordance with a result of the comparison performed in the determination period;

until the reference signal reaches the threshold from the first period, changing the reference signal without changing a direction of change of the reference signal with respect to the lapse of time;

change of voltage of the reference signal with respect to the lapse of time is continued without being interrupted until the reference signal reaches the threshold after the reference signal starts to change in the first period, and the direction of the change of the reference signal with respect to the lapse of time is not changed until the end of the determination period from the start of the first period.

15. An imaging system comprising:

the solid state imaging device according to claim 1: and a signal processing device that processes image signals output from the solid state imaging device.

16. An imaging system comprising:

the solid state imaging device according to claim 5: and a signal processing device that processes image signals output from the solid state imaging device.

17. The imaging system according to claim 15, wherein the pixel includes a plurality of the photoelectric conversion units, and wherein the signal processing device processes the image signals generated by the plurality of the photoelectric conversion units, respectively, and acquires distance information on a distance from the solid state imaging device to a subject.

18. The imaging system according to claim 16, wherein the pixel includes a plurality of the photoelectric conversion units, and wherein the signal processing device processes the image signals generated by the plurality of the photoelectric conversion units, respectively, and acquires distance information on a distance from the solid state imaging device to a subject.

19. A solid state imaging device comprising:
a pixel comprising at least one photoelectric conversion unit and a transfer transistor connected to the photoelectric conversion unit, and outputs a pixel signal corresponding to an incident light;
a reference signal generation unit that generates at least one reference signal that changes with the lapse of time at a predetermined change rate; and
an analog-to-digital converter unit that includes a comparator unit configured to output a result of a comparison of the pixel signal with the reference signal,
wherein, in a first period, the analog-to-digital converter unit converts a first pixel signal into a first digital signal,
in a determination period after the first period, the analog-to-digital converter unit performs the comparison of a second pixel signal with the reference signal set to a predetermined threshold,
in a second period after the determination period, the analog-to-digital converter unit converts the second pixel signal at a gain in accordance with a result of the comparison performed in the determination period into a second digital signal, change of voltage of the reference signal with respect to the lapse of time is continued without being interrupted until the reference signal reaches the threshold after the reference signal starts to change when the comparator unit outputs the result of a comparison of the first pixel signal with the reference signal in the first period, and the direction of the change of the reference signal with respect to the lapse of time is not changed until the end of the determination period from the start of the first period.

* * * * *